United States Patent
Pipkin et al.

(10) Patent No.: US 12,527,755 B2
(45) Date of Patent: Jan. 20, 2026

(54) FORMULATIONS CONTAINING ACETAMINOPHEN AND SULFOALKYL ETHER CYCLODEXTRIN

(71) Applicant: CyDex Pharmaceuticals, Inc., San Diego, CA (US)

(72) Inventors: James D. Pipkin, Lawrence, KS (US); Gerold L. Mosher, Kansas City, MO (US); Roger A. Rajewski, Lawrence, KS (US)

(73) Assignee: CyDex Pharmaceuticals, Inc., San Diego, CA (US)

( * ) Notice: Subject to any disclaimer, the term of this patent is extended or adjusted under 35 U.S.C. 154(b) by 266 days.

(21) Appl. No.: 16/333,576

(22) PCT Filed: Sep. 15, 2017

(86) PCT No.: PCT/US2017/051919
§ 371 (c)(1),
(2) Date: Mar. 14, 2019

(87) PCT Pub. No.: WO2018/053358
PCT Pub. Date: Mar. 22, 2018

(65) Prior Publication Data
US 2019/0255000 A1    Aug. 22, 2019

Related U.S. Application Data

(60) Provisional application No. 62/395,794, filed on Sep. 16, 2016.

(51) Int. Cl.
| | | |
|---|---|---|
| *A61K 31/167* | (2006.01) | |
| *A61K 9/00* | (2006.01) | |
| *A61K 9/08* | (2006.01) | |
| *A61K 9/16* | (2006.01) | |
| *A61K 9/19* | (2006.01) | |
| *A61P 25/04* | (2006.01) | |
| *A61P 29/00* | (2006.01) | |
| *A61K 47/40* | (2006.01) | |

(52) U.S. Cl.
CPC .......... *A61K 31/167* (2013.01); *A61K 9/0019* (2013.01); *A61K 9/08* (2013.01); *A61K 9/1652* (2013.01); *A61K 9/19* (2013.01); *A61P 25/04* (2018.01); *A61P 29/00* (2018.01); *A61K 47/40* (2013.01)

(58) Field of Classification Search
CPC .................................................. A61K 31/167
See application file for complete search history.

(56) References Cited

U.S. PATENT DOCUMENTS

| | | | |
|---|---|---|---|
| 2003/0216353 A1 | 11/2003 | Mosher | |
| 2005/0164986 A1* | 7/2005 | Mosher | A61K 47/40 |
| | | | 435/253.6 |
| 2011/0015273 A1 | 1/2011 | Kandhagatla et al. | |

FOREIGN PATENT DOCUMENTS

| | | |
|---|---|---|
| CN | 102871994 | 7/2015 |
| EP | 2 277 546 | 1/2011 |
| EP | 2 918 291 | 9/2015 |
| FR | 2751875 | 2/1998 |
| RU | 2173172 | 9/2001 |
| WO | WO 03/080079 | 10/2003 |
| WO | WO 12/037117 | 3/2012 |
| WO | WO 2013/130666 A1 | 9/2013 |
| WO | WO 12/136775 | 8/2017 |

OTHER PUBLICATIONS

Kaulpiboon et al., 2010, Effect of temperature on cyclodextrin production and characterization of paracetamol/cyclodextrin complexes, Journal of the Medical Association of Thailand, 93(Supp 6):S160-165.
Lin et al., 1984, Kinetic determinations of stability of acetaminophen with cyclodextrins and glucose in aqueous solution, International Journal of Pharmaceutical Technology & Product Manufacture 5(4):19-24.
International Search Report and Written Opinion dated Nov. 6, 2017 in application No. PCT/US2017/051919.
Jones, 2011, Acetaminophen injection: a review of clinical information, Journal of Pain & Palliative Care Pharmacotherapy, 25(4):340-349.

* cited by examiner

*Primary Examiner* — Yong S. Chong
(74) *Attorney, Agent, or Firm* — Knobbe Martens Olson & Bear LLP

(57) ABSTRACT

Pharmaceutical formulations containing acetaminophen and sulfoalkyl ether cyclodextrin are described. The formulation includes acetaminophen; and sulfoalkyl ether cyclodextrin, wherein the molar ratio of sulfoalkyl ether cyclodextrin to acetaminophen is in the range of about 0.01 to about 2. The formulations can be prepared in an injectable form for mitigating or treating fever or alleviating pain in a patient.

36 Claims, 4 Drawing Sheets

FORMULATIONS CONTAINING ACETAMINOPHEN AND SULFOALKYL ETHER CYCLODEXTRIN

CROSS REFERENCE TO RELATED APPLICATIONS

This application is U.S. National Phase under 35 U.S.C. § 371 of International Application No. PCT/US2017/051919, filed Sep. 15, 2017, designating the U.S. and published in English as International Pub. No. WO 2018/053358, which claims the benefit of U.S. Provisional Application No. 62/395,794, filed Sep. 16, 2016, all of which are incorporated herein by reference in their entirety.

BACKGROUND

Field

The present invention relates to formulations containing acetaminophen and sulfoalkyl ether cyclodextrin.

Description of the Related Art

Acetaminophen, also known as paracetamol, or APAP, chemically named N-acetyl-p-aminophenol, is a widely used over-the-counter analgesic (pain reliever) and antipyretic (fever reducer). Acetaminophen is classified as a mild analgesic. It is commonly used for the relief of headaches and other minor aches and pains and is a major ingredient in numerous cold and flu remedies. In combination with opioid analgesics, paracetamol can also be used in the management of more severe pain such as post-surgical pain and providing palliative care in advanced cancer patients.

Acetaminophen in a pharmaceutical formulation is susceptible hydrolysis to form p-aminophenol, which can then degrade into quinoneimine (cf. for example J. E. Fairbrother, "Acetaminophen" in Analytical Profiles of Drug Substances, 1974, vol. 3, pp. 1-109). The rate of degradation of paracetamol increases with increasing temperature and light. This rate is minimal at a pH in the region of 6 (K. T. Koshy et al., 1961, J. Pharm. Sci. 50, pp. 116-118). Methods of stabilizing injectable solutions of acetaminophen through addition of a buffer or free-radical scavenger have the drawback of causing a potential irritant, allergenic and/or carcinogenic effect in certain patients.

SUMMARY

Some embodiments relate to a pharmaceutical formulation, including acetaminophen; and sulfoalkyl ether cyclodextrin, wherein the molar ratio of sulfoalkyl ether cyclodextrin to acetaminophen is in the range of about 0.01 to about 2, and wherein the formulation does not contain N-acetylcysteine, L-methionine, L-cysteine, cysteine hydrochloride, or mixtures thereof.

Some embodiments relate to a sterile single-use container, comprising acetaminophen; and sulfoalkyl ether cyclodextrin, wherein the acetaminophen and sulfoalkyl ether cyclodextrin are in solid form, wherein the molar ratio of sulfoalkyl ether cyclodextrin to acetaminophen is in the range of about 0.01 to about 2.

Some embodiments relate to a method of mitigating or treating fever or alleviating pain in a subject in need thereof, comprising administering by injection to the subject an effective amount of a liquid formulation comprising acetaminophen and sulfoalkyl ether cyclodextrin, wherein the molar ratio of sulfoalkyl ether cyclodextrin to acetaminophen is in the range of about 0.01 to about 2.

DETAILED DESCRIPTION OF THE PREFERRED EMBODIMENT

Figure 1:
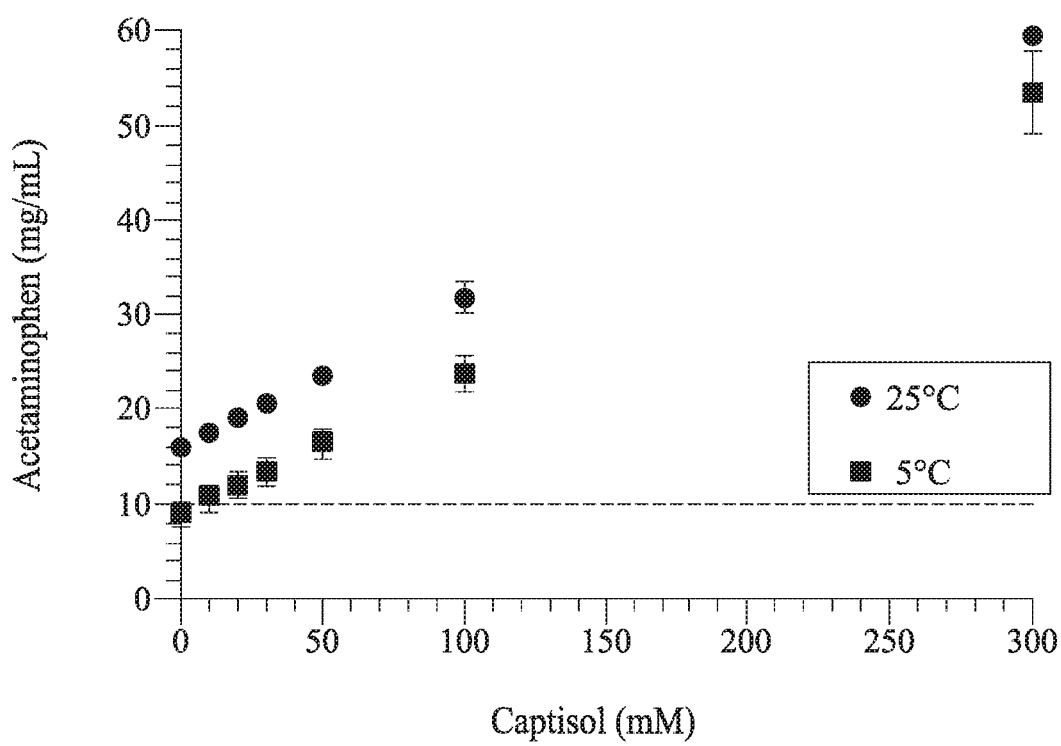
FIG. 1 shows the phase solubility of acetaminophen in CAPTISOL® solutions at 5° C. and 25° C.

The term "pharmaceutically acceptable cation" refers to cations that retain the biological effectiveness and properties of a compound and, which are not biologically or otherwise undesirable for use in a pharmaceutical. Examples of cation include but are not limited to sodium, potassium, lithium, ammonium, calcium, magnesium, iron, zinc, copper, manganese, aluminum, and the like; particularly preferred are the ammonium, potassium, sodium, calcium and magnesium cations. Other types of cations can include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such cations are known in the art, as described in WO 87/05297, Johnston et al., published Sep. 11, 1987 (incorporated by reference herein in its entirety).

"The term "pharmaceutically acceptable salt" refers to salts that retain the biological effectiveness and properties of the compounds of the preferred embodiments and, which are not biologically or otherwise undesirable. In many cases, the compounds of the preferred embodiments are capable of forming acid and/or base salts by virtue of the presence of amino and/or carboxyl groups or groups similar thereto. Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Pharmaceutically acceptable base addition salts can be formed with inorganic and organic bases. Inorganic bases from which salts can be derived include, for example, sodium, potassium, lithium, ammonium, calcium, magnesium, iron, zinc, copper, manganese, aluminum, and the like; particularly preferred are the ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such salts are known in the art, as described in World Patent Publication 87/05297, Johnston et al., published Sep. 11, 1987 (incorporated by reference herein).

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group may be designated as "$C_{1-4}$ alkyl" or similar designations. By way of example only, "$C_{1-4}$ alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

A "sulfonyl" group refers to an "—$SO_2R$" group in which R is selected from hydrogen. $C_{1-5}$ alkyl, $C_{2-6}$ alkenyl, $C_{2-6}$ alkynyl, $C_{3-7}$ carbocyclyl, $C_{6-10}$ aryl, 5-10 membered heteroaryl, and 3-10 membered heterocyclyl, as defined herein.

"Subject" as used herein, means a human or a non-human mammal, e.g., a dog, a cat, a mouse, a rat, a cow, a sheep, a pig, a goat, a non-human primate or a bird, e.g., a chicken, as well as any other vertebrate or invertebrate.

The term "mammal" is used in its usual biological sense. Thus, it specifically includes, but is not limited to, primates, including simians (chimpanzees, apes, monkeys) and humans, cattle, horses, sheep, goats, swine, rabbits, dogs, cats, rodents, rats, mice guinea pigs, or the like.

An "effective amount" or a "therapeutically effective amount" as used herein refers to an amount of a therapeutic agent that is effective to relieve, to some extent, or to reduce the likelihood of onset of, one or more of the symptoms of a disease or condition, and includes curing a disease or condition. "Curing" means that the symptoms of a disease or condition are eliminated; however, certain long-term or permanent effects may exist even after a cure is obtained (such as extensive tissue damage).

"Treat," "treatment," or "treating," as used herein refers to administering a pharmaceutical composition to a subject for prophylactic and/or therapeutic purposes. The term "prophylactic treatment" refers to treating a subject who does not yet exhibit symptoms of a disease or condition, but who is susceptible to, or otherwise at risk of, a particular disease or condition, whereby the treatment reduces the likelihood that the patient will develop the disease or condition. The term "therapeutic treatment" refers to administering treatment to a subject already suffering from a disease or condition.

Cyclodextrin

The term "cyclodextrin" as used herein refers to an α-cyclodextrin, β-cyclodextrin, γ-cyclodextrin, or their respective derivatives, including derivatives in which one or more hydroxy on the cyclodextrin core is replaced with an alkylether, hydroxyalkylether, or sufloalkylether substituent. Examples of cyclodextrin derivative can include but are not limited to the cyclodextrins listed in Table A below. Preferably, the cyclodextrin is a β-cyclodextrin, hydroxypropyl-β-cyclodextrin, or sulfoalkyl ether β-cyclodextrin.

TABLE A

| Mixed ether CD derivative | Mixed ether CD derivative | Mixed ether CD derivative |
| --- | --- | --- |
| Sulfobutyl-hydroxybutyl-CD (SBE-HBE-CD) | Sulfopropyl-hydroxybutyl-CD (SPE-HBE-CD) | Sulfoethyl-hydroxybutyl-CD (SEE-HBE-CD) |
| Sulfobutyl-hydroxypropyl-CD (SBE-HPE-CD) | Sulfopropyl-hydroxypropyl-CD (SPE-HPE-CD) | Sulfoethyl-hydroxypropyl-CD (SEE-HPE-CD) |
| Sulfobutyl-hydroxyethyl-CD (SBE-HEE-CD) | Sulfopropyl-hydroxyethyl-CD (SPE-HEE-CD) | Sulfoethyl-hydroxyethyl-CD (SEE-HEE-CD) |
| Sulfobutyl-hydroxybutenyl-CD (SBE-HBNE-CD) | Sulfopropyl-hydroxybutenyl-CD (SPE-HBNE-CD) | Sulfoethyl-hydroxybutenyl-CD (SEE-HBNE-CD) |
| Sulfobutyl-ethyl (SBE-EE-CD) | Sulfopropyl-ethyl (SPE-EE-CD) | Sulfoethyl-ethyl (SEE-EE-CD) |
| Sulfobutyl-methyl (SBE-ME-CD) | Sulfopropyl-methyl (SPE-ME-CD) | Sulfoethyl-methyl (SEE-ME-CD) |
| Sulfobutyl-propyl (SBE-PE-CD) | Sulfopropyl-propyl (SPE-PE-CD) | Sulfoethyl-propyl (SEE-PE-CD) |
| Sulfobutyl-butyl (SBE-BE-CD) | Sulfopropyl-butyl (SPE-BE-CD) | Sulfoethyl-butyl (SEE-BE-CD) |
| Sulfobutyl-carboxymethyl-CD (SBE-CME-CD) | Sulfopropyl-carboxymethyl-CD (SPE-CME-CD) | Sulfoethyl-carboxymethyl-CD (SEE-CME-CD) |
| Sulfobutyl-carboxyethyl-CD (SBE-CEE-CD) | Sulfopropyl-carboxyethyl-CD (SPE-CEE-CD) | Sulfoethyl-carboxyethyl-CD (SEE-CEE-CD) |
| Sulfobutyl-acetate-CD (SBE-AA-CD) | Sulfopropyl-acetate-CD (SPE-AA-CD) | Sulfoethyl-acetate-CD (SEE-AA-CD) |
| Sulfobutyl-propionate-CD (SBE-PA-CD) | Sulfopropyl-propionate-CD (SPE-PA-CD) | Sulfoethyl-propionate-CD (SEE-PA-CD) |
| Sulfobutyl-butyrate-CD (SBE-BA-CD) | Sulfopropyl-butyrate-CD (SPE-BA-CD) | Sulfoethyl-butyrate-CD (SEE-BA-CD) |

TABLE A-continued

| Mixed ether CD derivative | Mixed ether CD derivative | Mixed ether CD derivative |
|---|---|---|
| Sulfobutyl-methoxycarbonyl-CD (SBE-MC-CD) | Sulfopropyl-methoxycarbonyl-CD (SPE-MC-CD) | Sulfoethyl-methoxycarbonyl-CD (SEE-MC-CD) |
| Sulfobutyl-ethoxycarbonyl-CD (SBE-EC-CD) | Sulfopropyl-ethoxycarbonyl-CD (SPE-EC-CD) | Sulfoethyl-ethoxycarbonyl-CD (SEE-EC-CD) |
| Sulfobutyl-propoxycarbonyl-CD (SBE-PC-CD) | Sulfopropyl-propoxycarbonyl-CD (SPE-PC-CD) | Sulfoethyl-propoxycarbonyl-CD (SEE-PC-CD) |
| Hydroxybutyl-hydroxybutenyl-CD (HBE-HBNE-CD) | Hydroxypropyl-hydroxybutenyl-CD (HPE-HBNE-CD) | Hydroxyethyl-hydroxybutenyl-CD (HEE-HBNE-CD) |
| Hydroxybutyl-ethyl (HBE-EE-CD) | Hydroxypropyl-ethyl (HPE-EE-CD) | Hydroxyethyl-ethyl (HEE-EE-CD) |
| Hydroxybutyl-methyl (HBE-ME-CD) | Hydroxypropyl-methyl (HPE-ME-CD) | Hydroxyethyl-methyl (HEE-ME-CD) |
| Hydroxybutyl-propyl (HBE-PE-CD) | Hydroxypropyl-propyl (HPE-PE-CD) | Hydroxyethyl-propyl (HEE-PE-CD) |
| Hydroxybutyl-butyl (HBE-BE-CD) | Hydroxypropyl-butyl (HPE-BE-CD) | Hydroxyethyl-butyl (HEE-BE-CD) |
| Hydroxybutyl-carboxymethyl-CD (HBE-CME-CD) | Hydroxypropyl-carboxymethyl-CD (HPE-CME-CD) | Hydroxyethyl-carboxymethyl-CD (HEE-CME-CD) |
| Hydroxybutyl-carboxyethyl-CD (HBE-CEE-CD) | Hydroxypropyl-carboxyethyl-CD (HPE-CEE-CD) | Hydroxyethyl-carboxyethyl-CD (HEE-CEE-CD) |
| Hydroxybutyl-acetate-CD (HBE-AA-CD) | Hydroxypropyl-acetate-CD (HPE-AA-CD) | Hydroxyethyl-acetate-CD (HEE-AA-CD) |
| Hydroxybutyl-propionate-CD (HBE-PA-CD) | Hydroxypropyl-propionate-CD (HPE-PA-CD) | Hydroxyethyl-propionate-CD (HEE-PA-CD) |
| Hydroxybutyl-butyrate-CD (HBE-BA-CD) | Hydroxypropyl-butyrate-CD (HPE-BA-CD) | Hydroxyethyl-butyrate-CD (HEE-BA-CD) |
| Hydroxybutyl-methoxycarbonyl-CD (HBE-MC-CD) | Hydroxypropyl-methoxycarbonyl-CD (HPE-MC-CD) | Hydroxyethyl-methoxycarbonyl-CD (HEE-MC-CD) |
| Hydroxybutyl-ethoxycarbonyl-CD (HBE-EC-CD) | Hydroxypropyl-ethoxycarbonyl-CD (HPE-EC-CD) | Hydroxyethyl-ethoxycarbonyl-CD (HEE-EC-CD) |
| Hydroxybutyl-propoxycarbonyl-CD (HBE-PC-CD) | Hydroxypropyl-propoxycarbonyl-CD (HPE-PC-CD) | Hydroxyethyl-propoxycarbonyl-CD (HEE-PC-CD) |
| Hydroxybutenyl-ethyl (HBNE-EE-CD) | Hydroxypropenyl-ethyl (HPNE-EE-CD) | Hydroxypentenyl-ethyl (HPTNE-EE-CD) |
| Hydroxybutenyl-methyl (HBNE-ME-CD) | Hydroxypropenyl-methyl (HPNE-ME-CD) | Hydroxypentenyl-methyl (HPTNE-ME-CD) |
| Hydroxybutenyl-propyl (HBNE-PE-CD) | Hydroxypropenyl-propyl (HPNE-PE-CD) | Hydroxypentenyl-propyl (HPTNE-PE-CD) |
| Hydroxybutenyl-butyl (HBNE-BE-CD) | Hydroxypropenyl-butyl (HPNE-BE-CD) | Hydroxypentenyl-butyl (HPTNE-BE-CD) |
| Hydroxybutenyl-carboxymethyl-CD (HBNE-CME-CD) | Hydroxypropenyl-carboxymethyl-CD (HPNE-CME-CD) | Hydroxypentenyl-carboxymethyl-CD (HPTNE-CME-CD) |
| Hydroxybutenyl-carboxyethyl-CD (HBNE-CEE-CD)- | Hydroxypropenyl-carboxyethyl-CD (HPNE-CEE-CD) | Hydroxypentenyl-carboxyethyl-CD (HPTNE-CEE-CD) |
| Hydroxybutenyl-acetate-CD (HBNE-AA-CD) | Hydroxypropenyl-acetate-CD (HPNE-AA-CD) | Hydroxypentenyl-acetate-CD (HPTNE-AA-CD) |
| Hydroxybutenyl-propionate-CD (HBNE-PA-CD) | Hydroxypropenyl-propionate-CD (HPNE-PA-CD) | Hydroxypentenyl-propionate-CD (HPTNE-PA-CD) |
| Hydroxybutenyl-butyrate-CD (HBNE-BA-CD) | Hydroxypropenyl-butyrate-CD (HPNE-BA-CD) | Hydroxypentenyl-butyrate-CD (HPTNE-BA-CD) |
| Hydroxybutenyl-methoxycarbonyl-CD (HBNE-MC-CD) | Hydroxypropenyl-methoxycarbonyl-CD (HPNE-MC-CD) | Hydroxypentenyl-methoxycarbonyl-CD (HPTNE-MC-CD) |
| Hydroxybutenyl-ethoxycarbonyl-CD (HBNE-EC-CD) | Hydroxypropenyl-ethoxycarbonyl-CD (HPNE-EC-CD) | Hydroxypentenyl-ethoxycarbonyl-CD (HPTNE-EC-CD) |
| Hydroxybutenyl-propoxycarbonyl-CD HBNE-PC-CD) | Hydroxypropenyl-propoxycarbonyl-CD (HPNE-PC-CD) | Hydroxypentenyl-propoxycarbonyl-CD (HPTNE-PC-CD) |

The terms "sulfoalkyl ether cyclodextrin" and "SAE-CD" as used herein refers to a cyclodextrin derivative containing a sulfoalkyl ether substituent, such as a $(C_{2-6}$ alkylene)-$SO_3^-$. The sulfoalkyl derivative of cyclodextrin can be a single derivative or a mixture of derivatives. Since the cyclodextrin derivatives contain sulfonyl groups, they can be charged species. The sulfoalkyl ether cyclodextrin can be either substituted at least at one of the primary hydroxyl groups of cyclodextrin or they are substituted at both the primary hydroxyl groups and at the 3-positioned hydroxyl group. Substitution at the 2-position is also possible. Examples of sulfoalkyl ether cyclodextrin include sulfobutyl ether β cyclodextrin.

In some embodiments, the cyclodextrin is a compound of Formula 1:

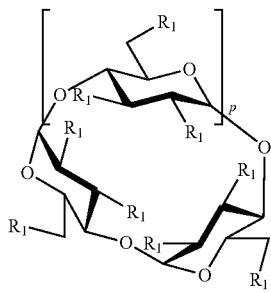

Formula (I)

or a pharmaceutically acceptable salt thereof, wherein:
p is 4, 5, or 6, and each $R_1$ is selected from —OH, or —O—$(C_1$-$C_8$ alkylene)-$SO_3$T, and
each T is independently hydrogen or pharmaceutically acceptable cation,
provided that at least one $R_1$ is —OH.

In some embodiments, each $R_1$ is independently —OH or —O—$(C_1$-$C_8$ alkylene)-$SO_3$T, provided that at least one $R_1$ is OH and at least one $R_1$ is —O—$(C_1$-$C_8$ alkylene)-$SO_3$T, wherein T is a hydrogen or pharmaceutically acceptable cation. In some embodiments, at least one $R_1$ is independently —OH or —O—$(C_{1-4}$ alkylene)-$SO_3$T. In some embodiments, at least one $R_1$ is independently a —O—$(CH_2)_g SO_3$T group, wherein g is 2 to 6, or 2 to 4. In some embodiments, at least one $R_1$ is independently —$OCH_2CH_2CH_2SO_3$T or —$OCH_2CH_2CH_2CH_2SO_3$T. In some embodiments, T is H. In some embodiments, T is $Na^+$. In some embodiments, each T is independently selected from an alkali metal, an alkaline earth metals, ammonium ions, and amine cations such as the, and combinations thereof. In some embodiments, each T is independently selected from $Li^+$, $Na^+$, $K^+$, $Ca^{+2}$, $Mg^{+2}$, amine, and any combination thereof. In some embodiments, each T is independently an amine cation selected from $(C_1$-$C_6)$-alkylamines, piperidine, pyrazine, $(C_1$-$C_6$-alkanolamine, ethylenediamine and $(C_4$-$C_8)$-cycloalkanolamine.

In some embodiments, each $R_1$ is independently —OH or —O—$(C_1$-$C_8$ alkyl), provided that at least one $R_1$ is OH and at least one $R_1$ is —O—$(C_1$-$C_8$ alkyl). In some embodiments, each $R_1$ is independently selected from methyl ether, ethyl ether, propyl ether, butyl ether, pentyl ethyl, and hexyl ether.

In some embodiments, each $R_1$ is independently —OH or O—$(C_1$-$C_6$ alkyl)-OH, provided that at least one $R_1$ is OH and at least one $R_1$ is O—$(C_1$-$C_6$ alkyl)-OH. In some embodiments, at least one $R_1$ is —O—$(C_1$-$C_6$ alkyl)-OH. In some embodiments, each $R_1$ is independently selected from hydroxymethyl ether, hydroxyethyl ether, hydroxypropyl ether, hydroxybutyl ether, hydroxypentyl ether, and hydroxyhexyl ether.

In some embodiments, a cyclodextrin derivative such as a sulfoalkyl ether cyclodextrin, an alkylated cyclodextrin, or a hydroxyalkyl ether cyclodextrin can have an average degree of substitution (ADS) of 2 to 9, 4 to 8, 4 to 7.5, 4 to 7, 4 to 6.5, 4.5 to 8, 4.5 to 7.5, 4.5 to 7, 5 to 8, 5 to 7.5, 5 to 7, 5.5 to 8, 5.5 to 7.5, 5.5 to 7, 5.5 to 6.5, 6 to 8, 6 to 7.5, 6 to 7.1, 6.5 to 7.1, 6.2 to 6.9, or 6.5 per cyclodextrin, and the remaining substituents are —H.

Some embodiments provide compositions containing a single type of cyclodextrin derivative having the structure set out in formula (I), where the composition overall contains on the average at least 1 and up to 3n+6 alkylsulfonic acid moieties per cyclodextrin molecule. The compositions described herein also includes compositions containing cyclodextrin derivatives having a narrow or wide range for degree of substitution and high or low degree of substitution. These combinations can be optimized as needed to provide cyclodextrins having particular properties.

Exemplary SAE-CD derivatives include SBE4-β-CD, SBE7-β-CD, SBE11-β-CD, SBE7-γ-CD and SBE5-γ-CD which correspond to SAE-CD derivatives of the formula I wherein p=5, 5, 5, 6 and 6, respectively; and there are on average 4, 7, 11, 7 and 5 sulfoalkyl ether substituents present, respectively. Other exemplary SAE-CD derivatives include those of the formula SAEx-R-CD (Formula 2), wherein SAE is sulfomethyl ether (SME), sulfoethyl ether (SEE), sulfopropyl ether (SPE), sulfobutyl ether (SBE), sulfopentyl ether (SPtE), or sulfohexyl ether (SHE); x (average or specific degree of substitution) is 1-18, 1-21, or 1-24; R (ring structure of parent cyclodextrin) is α, β or γ, respectively; and CD is cyclodextrin. The SAE functional group includes a cationic counterion as disclosed herein or generally as used in the pharmaceutical industry for the counterion of any acidic group. Since SAE-CD is a polyanionic cyclodextrin, it can be provided in different salt forms. Suitable counterions for the SAE functional group(s) include cationic organic atoms or molecules and cationic inorganic atoms or molecules. The SAE-CD can include a single type of counterion or a mixture of different counterions. The properties of the SAE-CD can be modified by changing the identity of the counterion present. For example, a first salt form of SAE-CD can have a greater electrostatic charge than a different second salt form of SAE-CD. The calcium salt form has been found to be more electronegative than the sodium salt form. Likewise, a SAE-CD having a first degree of substitution can have a greater electrostatic charge than a second SAE-CD having a different degree of substitution.

Some embodiments provide compositions of SAE-CD where the SAE-CD is a sulfobutyl ether derivative of beta cyclodextrin (SBE-β-CD) having the following structure:

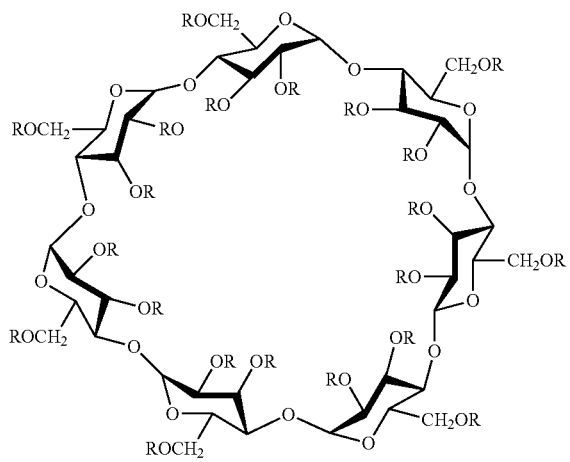

wherein each R is independently —H or —$(CH_2)_4$—$SO_3Na$ and the average degree of substitution with —$(CH_2)_4$—$SO_3Na$ groups is between 6 and 7.1.

Methods of preparing SAE-CD derivatives are varied but generally include the general steps of sulfoalkylation followed by isolation. The chemical property profile of the SAE-CD is established during the sulfoalkylation step. For example, altering reaction conditions during sulfoalkylation can vary the average degree of substitution for and the average regiochemical distribution of sulfoalkyl groups in the SAE-CD. The alkyl chain length of the sulfoalkyl functional group is determined according the sulfoalkylating agent used. And use of a particular alkalizing agent during alkylation would result in formation of a particular SAE-CD salt, unless an ion exchange step were performed subsequent to sulfoalkylation.

In general, known processes for the sulfoalkylation step include, for example: 1) exposure of underivatized parent cyclodextrin under alkaline conditions to an alkylating agent, e.g. alkyl sultone or a haloalkylsulfonate; 2) optional addition of further alkalizing agent to the reaction milieu to consume excess alkylating agent; and 3) neutralization of the reaction medium with acidifying agent. The vast majority of literature processes conduct the sulfoalkylation step in aqueous media; however, some references disclose the use of pyridine, dioxane, or DMSO as the reaction solvent for sulfoalkylation. Literature discloses the use of an alkalizing agent in order to accelerate the sulfoalkylation reaction.

Upon completion of the sulfoalkylation step, isolation and purification of the SAE-CD is conducted.

Several different isolation processes for SAE-CD following sulfoalkylation and neutralization are described. In general, an aqueous liquid containing SAE-CD is dried to remove water to form a solid. The literature suggests various methods for removal of water from an aqueous solution containing SAE-CD. Such methods include conventional freeze-drying, spray drying, oven drying, vacuum oven drying, roto-evaporation under reduced pressure, vacuum drying or vacuum drum drying. See, for example, Ma (S.T.P. Pharma. Sciences (1999), 9(3), 261-266), CAPTISOL® (sulfobutyl ether beta-cyclodextrin sodium; Pharmaceutical Excipients 2004; Eds. R. C. Rowe, P. J. Sheskey, S. C. Owen; Pharmaceutical Press and American Pharmaceutical Association, 2004) and other references regarding the preparation of SAE-CD derivatives.

Suitable methods for preparing a SAE-CD-raw material for use in preparing the SAE-CD composition for use as described herein are disclosed in U.S. Pat. Nos. 5,376,645, 5,874,418, and 5,134,127 to Stella et al.; U.S. Pat. No. 3,426,011 to Parmerter et al.; Lammers et al. (Reel. Trav. CMm Pays-Bas (1972). 91(6), 733-742); Staerke (1971), 23(5), 167-171); Qu et al, (J Inclusion Phenom. Macro. Chem., (2002), 43, 213-221); U.S. Pat. No. 5,241,059 to Yoshinaga; U.S. Pat. No. 6,153,746 to Shah; PCT International Publication No. WO 2005/042584 to Stella et al; Adam et al. (J. Med. Chem. (2002), 45, 1806-1816); PCT International Publication No. WO 01/40316 to Zhang et al.; Tarver et al (Bioorganic & Medicinal Chemistry (2002), 10, 1819-1827); Ma (S.T.P. Pharma. Sciences (1999), 9(3), 261-266); Jung et al. (J Chromat. 1996, 755, 81-88); and Luna et al. (Carbohydr. Res. 1997, 299, 103-110), the entire disclosures of which are hereby incorporated by reference.

The SAE-CD raw material can be included in the liquid feed used in the fluidized bed spray drying process as described in U.S. Pat. No. 8,049,003, which is incorporated by reference for the purpose of preparing the SAE-CD composition through the fluidized bed spray drying process. Other methods for removal of water from an aqueous solution containing SAE-CD can include conventional freeze-drying, spray drying, oven drying, vacuum oven drying, roto-evaporation under reduced pressure, vacuum drying or vacuum drum drying. See, for example, Ma (S.T.P. Pharma. Sciences (1999), 9(3), 261-266), CAPTISOL® (sulfobutyl ether beta-cyclodextrin sodium; Pharmaceutical Excipients 2004; Eds. R. C. Rowe, P. J. Sheskey, S. C. Owen; Pharmaceutical Press and American Pharmaceutical Association, 2004), which is incorporated herein by reference in its entirety, and other references regarding the preparation of SAE-CD derivatives.

The SAE-CD composition described herein can also include a combination of derivatized cyclodextrin (SAE-CD) and underivatized cyclodextrin. For example, a SAE-CD composition can be made to include underivatized cyclodextrin in the amount of 0 to less than 50% by wt. of the total cyclodextrin present. Exemplary embodiments of the SAE-CD composition include those comprising 0-5% by wt., 5-50% by wt., less than 5%, less than 10%, less than 20%, less than 30%, less than 40%, or less than 50% underivatized cyclodextrin.

Compositions Containing Acetaminophen and Sulfoalkyl Ether Cyclodextrin

Some embodiments relate to a pharmaceutical formulation, comprising an acetaminophen; and sulfoalkyl ether cyclodextrin, wherein the molar ratio of sulfoalkyl ether cyclodextrin to acetaminophen is in the range of about 0.01 to about 2, and wherein the formulation does not contain N-acetylcysteine. L-methionine, L-cysteine, cysteine hydrochloride, or mixtures thereof.

In some embodiments, the molar ratio of sulfoalkyl ether cyclodextrin to acetaminophen is in the range of about 0.01 to less than 1. In some embodiments, the molar ratio of sulfoalkyl ether cyclodextrin to acetaminophen is in the range of about 0.05 to about 0.5, about 0.05 to about 0.25, about 0.05 to about 0.2, about 0.05 to about 0.15, or about 0.07 to about 0.15. In some embodiments, the molar ratio of sulfoalkyl ether cyclodextrin to acetaminophen is about 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0. In some embodiments, the molar ratio of sulfoalkyl ether cyclodextrin to acetaminophen is about 0.15.

In some embodiments, the concentration of acetaminophen is in the range of about 1 mg/ml to 50 mg/ml, about 5 mg/ml to about 20 mg/ml, or about 8 mg/ml to about 12 mg/ml. In some embodiments, the concentration of acetaminophen is in the range of about 8 mg/ml to about 12 mg/ml. In some embodiments, the concentration of acetaminophen is about 10 mg/ml. In some embodiments, the concentration of acetaminophen is at least about 20 mg/ml. In some embodiments, the concentration of acetaminophen is at least about 30 mg/ml. In some embodiments, the concentration of acetaminophen is about 33 mg/ml.

In some embodiments, the sulfoalkyl ether cyclodextrin has a concentration of about 1 mM to about 500 mM. In some embodiments, the sulfoalkyl ether cyclodextrin has a concentration of about 10 mM to about 400 mM. In some embodiments, the sulfoalkyl ether cyclodextrin has a concentration of about 1 mM to about 150 mM. In some embodiments, the sulfoalkyl ether cyclodextrin has a concentration of less than 200 mM, 190 mM, 180 mM, 170 mM, 160 mM, 150 mM, 140 mM, 130 mM, 120 mM, 110 mM, 100 mM, 90 mM, 80 mM, 70 mM, 60 mM, 50 mM. In some embodiments, the sulfoalkyl ether cyclodextrin has a concentration of less than 40 mM, 30 mM, 20 mM, 10 mM, 5 mM, or 1 mM. In some embodiments, the sulfoalkyl ether cyclodextrin has a concentration of about 200 mM, 190 mM, 180 mM, 170 mM, 166 mM, 160 mM, 150 mM, 140 mM, 130 mM, 120 mM, 115 mM, 110 mM, 100 mM, 90 mM, 80 mM, 70 mM, 60 mM, 50 mM, 46 mM, 40 mM, 30 mM, 20 mM, 10 mM, 5 mM, or 1 mM. In some embodiments, the sulfoalkyl ether cyclodextrin has a concentration of about 10 mM.

In some embodiments, the sulfoalkyl ether cyclodextrin has a concentration of about 1 mg/ml to about 500 mg/ml. In some embodiments, the sulfoalkyl ether cyclodextrin has a concentration of about 50 mg/ml to about 400 mg/ml. In some embodiments, the sulfoalkyl ether cyclodextrin has a concentration of about 10 mg/ml to about 150 mg/ml. In some embodiments, the sulfoalkyl ether cyclodextrin has a concentration of less than 500 mg/ml, 400 mg/ml, 360 mg/ml, 250 mg/ml, 200 mg/ml, 150 mg/ml, 120 mg/ml, 110 mg/ml, 100 mg/ml, 90 mg/ml, 80 mg/ml, 70 mg/ml, 60 mg/ml, or 50 mg/ml. In some embodiments, the sulfoalkyl ether cyclodextrin has a concentration of less than 40 mg/ml, 30 mg/ml, 20 mg/ml, 10 mg/ml, 5 mg/ml, or 1 mg/ml. In some embodiments, the sulfoalkyl ether cyclodextrin has a concentration of about 400 mg/ml, 360 mg/ml, 300 mg/ml, 250 mg/ml, 200 mg/ml, 190 mg/ml, 180 mg/ml, 170 mg/ml, 166 mg/ml, 160 mg/ml, 150 mg/ml, 140 mg/ml, 130 mg/ml, 120 mg/ml, 110 mg/ml, 100 mg/ml, 90 mg/ml, 80 mg/ml, 70 mg/ml, 60 mg/ml, 50 mg/ml, 40 mg/ml, 30 mg/ml, 20 mg/ml, 10 mg/ml, 5 mg/ml, or 1 mg/ml. In some embodiments, the sulfoalkyl ether cyclodextrin has a concentration of about 100 mg/ml. In some embodiments, the sulfoalkyl ether cyclodextrin has a concentration of about 200 mg/ml. In some embodiments, the sulfoalkyl ether cyclodextrin has a concentration of about 250 mg/ml. In some embodiments, the sulfoalkyl ether cyclodextrin has a concentration of about 360 mg/ml.

In some embodiments, the formulation described herein contains less than about 10 μg/ml, 9 μg/ml, 8 μg/ml, 7 μg/ml, 6 μg/ml, 5.8 μg/ml, 5.5 μg/ml, 5 μg/ml, 4 μg/ml, 3 μg/ml, 2.6 μg/ml, 2 μg/ml, 1.5 μg/ml, 1 μg/ml, 0.5 μg/ml, 0.1 μg/ml, 0.05 μg/ml, 0.02 μg/ml, or 0.01 μg/ml of p-aminophenol. In some embodiments, the formulation contains less than 2.6 μg/ml of p-aminophenol. In some embodiments, the formulation contains less than 0.05 μg/ml of p-aminophenol.

In some embodiments, the formulation described herein contains less than about 10%, 8%, 6%, 5%, 4%, 2%. 1%, 0.8%. 0.6%, 0.5%, 0.4%, 0.2%, 0.15%, 0.10%, 0.08%, 0.05%, 0.01%, 0.005%, or 0.001% by weight of p-aminophenol based on the total amount of acetaminophen in the formulation. In some embodiments, the formulation contains less than about 0.20% by weight of p-aminophenol based on the total amount of acetaminophen in the formulation. In some embodiments, the formulation contains less than about 0.15% by weight of p-aminophenol based on the total amount of acetaminophen in the formulation. In some embodiments, the formulation contains less than about 0.005% by weight of p-aminophenol based on the total amount of acetaminophen in the formulation.

The amount of p-aminophenol in the formulation can be measured after various storage conditions. In some embodiments, the amount of p-arninophenol described herein is measured after the formulation is stored at 5° C. In some embodiments, the amount of p-aminophenol described herein is measured after the formulation is stored at 15°. In some embodiments, the amount of p-aminophenol described herein is measured after the formulation is stored at 25° C. In some embodiments, the amount of p-arninophenol described herein is measured after the formulation is stored at 40° C. In some embodiments, the amount of p-aminophenol described herein is measured after the formulation is stored at a humidity level of 10%, 20%, 30%, 40%, 50%, 60%, 70%, or 80%. In some embodiments, the amount of p-aminophenol described herein is measured after the formulation is stored at a humidity level of 60%. In some embodiments, the amount of p-aminophenol described herein is measured after the formulation is stored for 1 month, 2 months. 3 months, 4 months, 5 months, 6 months, 7 months, 8 months, 9 months, 10 months, 11 months, 12 months, 15 months. 20 months, or 24 months. In some embodiments, the amount of p-aminophenol described herein is measured after the formulation is stored at 25° C. 60% humidity for 12 months. In some embodiments, the amount of p-aminophenol described herein is measured after the formulation is stored at 5° C. for 12 months.

In some embodiments, the formulation is scrubbed of oxygen before storage. In some embodiments, the formulation is not scrubbed of oxygen before storage. In some embodiments, the formulation is stored under an inert gas e.g., nitrogen and argon). In some embodiments, the formulation is flushed with an inert gas before storage. In some embodiments, the formulation is stored in a sealed container having the head space filled with an inert gas.

In some embodiments, the amount of dissolved oxygen in the formulation prior to storage is greater than 0.005 ppm, 0.01 ppm 0.025 ppm, 0.05 ppm, 0.08 ppm, 0.1 ppm, 0.5 ppm, 0.8 ppm, 1.0 ppm, 1.2 ppm, 1.5 ppm, 1.8 ppm, 2.0 ppm, 2.5 ppm, 3.0 ppm, 3.5 ppm, 4.0 ppm, 4.5 ppm, 5.0 ppm, 5.5 ppm, 6.0 ppm, 6.5 ppm, 7.0 ppm, 7.5 ppm, 8.0 ppm, 8.5 ppm, 9.0 ppm, 9.5 ppm, 10.0 ppm, 12.5 ppm 15 ppm or 20 ppm. In some embodiments, the amount of dissolved oxygen in the formulation prior to storage is greater than 1 ppm. In some embodiments, the amount of dissolved oxygen in the formulation prior to storage is greater than 2 ppm. In some embodiments, the amount of dissolved oxygen in the formulation prior to storage is less than 0.005 ppm, 0.01 ppm, 0.05 ppm, 0.08 ppm, 0.1 ppm 0.025 ppm, 0.5 ppm, 0.8 ppm, 1.0 ppm, 1.2 ppm, 1.5 ppm, 1.8 ppm, 2.0 ppm, 2.5 ppm, 3.0 ppm, 3.5 ppm, 4.0 ppm, 4.5 ppm, 5.0 ppm, 5.5 ppm, 6.0 ppm, 6.5 ppm, 7.0 ppm, 7.5 ppm, 8.0 ppm, 8.5 ppm, 9.0 ppm, 9.5 ppm, 10.0 ppm, 12.5 ppm, 15 ppm, or 20 ppm. In some embodiments, the amount of dissolved oxygen in the formulation prior to storage is less than 1 ppm. In some embodiments, the amount of dissolved oxygen in the formulation prior to storage is less than 2 ppm.

In some embodiments, the formulation is an aqueous solution. In some embodiments, the formulation is a lyophilized or spray-dried powder.

In some embodiments, the formulation does not contain a corticosteroid. In some embodiments, the formulation does not contain an androgen. In some embodiments, the formulation does not contain a clopidogrel. In some embodiments, the formulation does not contain a fluoroquinolone. In some embodiments, the formulation does not contain a benzhydrylpiperazine. In some embodiments, the formulation does not contain a cetirizine. In some embodiments, the formulation does not contain a nicotine. In some embodiments, the formulation does not contain a 17α-ethynyl-5α-androstane-3α,17β-diol. In some embodiments, the formulation does not contain a pyrone analog. In some embodiments, the formulation does not contain a flavonoid. In some embodiments, the formulation does not contain a quercetin.

In some embodiments, the formulation described herein further includes one or more pharmaceutically acceptable excipient.

In some embodiments, the formulation described herein includes a buffer. In some embodiments, the buffer is a phosphate buffer. In some embodiments, the buffer is an acetate buffer.

In some embodiments, the buffer has a concentration in the range of 1 mM to about 150 mM. In some embodiments, the buffer concentration is about 3, 5, 10, 15, 20, 25, 30, 35, 40, 45, or 50 mM. In some embodiments, the buffer concentration is greater than about 3, 5, 7.5, 10, 15, or 20 mM.

In some embodiments, the formulation has a pH in the range of about 5 to about 10. In some embodiments, the pH of the formulation is in the range of about 5.8 to about 7.4. In some embodiments, the pH of the formulation is about 5, 5.5, 5.8, 6, 6.2, 6.5, 6.8, 7.0, 7.2, and 7.4. In some embodiments, the formulation has a pH greater than about 5.8. In some embodiments, the formulation has a pH of about 7.0. In some embodiments, the formulation has a pH of about 5.8. In some embodiments, the formulation has a pH in the range of about 5.5 to about 6.0.

In some embodiments, the formulation described herein further includes a salt. In some embodiments, the salt is sodium chloride.

In some embodiments, the formulation has an osmolality in the range of about 100 mOsm/kg to about 500 mOsm/kg. In some embodiments, the osmolality of the formulation is in the range of about 200 mOsm/kg to about 300 mOsm/kg. In some embodiments, the osmolality of the formulation is about 200, 225, 250, 280, 290, or 300 mOsm/kg. In some embodiments, the osmolality of the formulation is about 290 mOsm/kg.

Some embodiments relate to a sterile single-use container, comprising: acetaminophen and sulfoalkyl ether cyclodextrin, wherein the acetaminophen and sulfoalkyl ether cyclodextrin are in solid form. In some such embodiments, the molar ratio of sulfoalkyl ether cyclodextrin to acetaminophen is in the range of about 0.01 to about 2. In some embodiments, the molar ratio of sulfoalkyl ether cyclodextrin to acetaminophen is in the range of about 0.01 to about less than 1. In some embodiments, the molar ratio of sulfoalkyl ether cyclodextrin to acetaminophen is in the range of about 0.05 to about 0.5.

In some embodiments, the formulation described herein undergoes oxygen scrubbing prior to storage. In some embodiments, the formulation described herein undergoes oxygen scrubbing after preparation.

In some embodiments, the container used for storing the formulation described herein can have nitrogen or argon filled in the head space.

In some embodiments, the formulation described herein has no discoloration or precipitation formed even after one or more rounds of freeze-thaw. The compositions described herein have better stability than other acetaminophen compositions available on the market. For instance, the compositions containing acetaminophen and sulfoalkyl ether cyclodextrin as described herein, after freeze-thaw cycles, have remained in the solution without any precipitation or discoloration, while the commercially available acetaminophen formulations undergo precipitation, discoloration, or degradation and are less stable than the compositions containing acetaminophen and sulfoalkyl ether cyclodextrin as described herein.

The term "pharmaceutically acceptable carrier" or "pharmaceutically acceptable excipient" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the active ingredient, its use in the therapeutic compositions is contemplated. In addition, various adjuvants such as are commonly used in the art may be included. Considerations for the inclusion of various components in pharmaceutical compositions are described, e.g., in Gilman et al. (Eds.) (1990); Goodman and Gilman's: The Pharmacological Basis of Therapeutics, 8th Ed., Pergamon Press, which is incorporated herein by reference in its entirety.

The compositions described herein are preferably provided in unit dosage form. As used herein, a "unit dosage form" is a composition containing an amount of a compound that is suitable for administration to an animal, preferably mammal subject, in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded. The skilled artisan will recognize that the formulation does not specifically contemplate the entire course of therapy and such decisions are left for those skilled in the art of treatment rather than formulation.

The compositions useful as described above may be in any of a variety of suitable forms for a variety of routes for administration, for example, for oral, nasal, rectal, topical (including transdermal), ocular, intracerebral, intracranial, intrathecal, intra-arterial, intravenous, intramuscular, or other parental routes of administration. In some embodiments, the composition described herein can be made into in the form of a solid (e.g., lyophilized powder) that can be reconstituted with a suitable liquid prior to administration. In some embodiments, the composition described herein can be in a liquid form ready for administration. The skilled artisan will appreciate that oral and nasal compositions include compositions that are administered by inhalation, and made using available methodologies. In some embodiments, the composition described herein can be administered through any suitable infusion devices, portable devices, or wearable devices. Depending upon the particular route of administration desired, a variety of pharmaceutically-acceptable carriers well-known in the art may be used. Pharmaceutically-acceptable carriers include, for example, liquid fillers, diluents, hydrotropies, surface-active agents, and encapsulating substances. Optional pharmaceutically-active materials may be included, which do not substantially interfere with the inhibitory activity of the compound acetaminophen. The amount of carrier employed in conjunction with the compound is sufficient to provide a practical quantity of material for administration per unit dose of the compound. Techniques and compositions for making dosage forms useful in the methods described herein are described in the following references, all incorporated by reference herein: Modern Pharmaceutics, 4th Ed., Chapters 9 and 10 (Banker & Rhodes, editors, 2002); Lieberman et al., Pharmaceutical Dosage Forms: Tablets (1989); and Ansel, Introduction to Pharmaceutical Dosage Forms 8th Edition (2004).

Various oral dosage forms can be used, including liquid forms. Liquid oral dosage forms include aqueous solutions, emulsions, suspensions, solutions and/or suspensions reconstituted from non-effervescent granules, and effervescent preparations reconstituted from effervescent granules, containing suitable solvents, preservatives, emulsifying agents, suspending agents, diluents, sweeteners, melting agents, coloring agents and flavoring agents.

The pharmaceutically-acceptable carriers suitable for the preparation of unit dosage forms for peroral administration is well-known in the art. Peroral compositions include liquid solutions, emulsions, suspensions, and the like. The pharmaceutically-acceptable carriers suitable for preparation of such compositions are well known in the art. Typical components of carriers for syrups, elixirs, emulsions and suspensions include ethanol, glycerol, propylene glycol, polyethylene glycol, liquid sucrose, sorbitol and water. For a suspension, typical suspending agents include methyl cellulose, sodium carboxymethyl cellulose, AVICEL RC-591, tragacanth and sodium alginate; typical wetting agents include lecithin and polysorbate 80; and typical preservatives include methyl paraben and sodium benzoate. Peroral liquid compositions may also contain one or more components such as sweeteners, flavoring agents and colorants disclosed above.

Compositions described herein may optionally include other drug actives.

A liquid composition, which is formulated for topical ophthalmic use, is formulated such that it can be administered topically to the eye. The comfort may be maximized as much as possible, although sometimes formulation considerations (e.g. drug stability) may necessitate less than optimal comfort. In the case that comfort cannot be maximized, the liquid may be formulated such that the liquid is tolerable to the patient for topical ophthalmic use. Additionally, an ophthalmically acceptable liquid may either be packaged for single use, or contain a preservative to prevent contamination over multiple uses.

For ophthalmic application, solutions or medicaments are often prepared using a physiological saline solution as a major vehicle. Ophthalmic solutions may preferably be maintained at a comfortable pH with an appropriate buffer system. The formulations may also contain conventional, pharmaceutically acceptable preservatives, stabilizers and surfactants.

Preservatives that may be used in the pharmaceutical compositions disclosed herein include, but are not limited to, benzalkonium chloride, PHMB, chlorobutanol, thimerosal, phenylmercuric, acetate and phenylmercuric nitrate. A useful surfactant is, for example, Tween 80. Likewise, various useful vehicles may be used in the ophthalmic preparations disclosed herein. These vehicles include, but are not limited to, polyvinyl alcohol, povidone, hydroxypropyl methyl cellulose, poloxamers, carboxymethyl cellulose, hydroxyethyl cellulose and purified water.

Tonicity adjustors may be added as needed or convenient. They include, but are not limited to, salts, particularly sodium chloride, potassium chloride, mannitol and glycerin, or any other suitable ophthalmically acceptable tonicity adjustor.

Various buffers and means for adjusting pH may be used so long as the resulting preparation is ophthalmically acceptable. For many compositions, the pH will be between 4 and 9. Accordingly, buffers include acetate buffers, citrate buffers, phosphate buffers and borate buffers. Acids or bases may be used to adjust the pH of these formulations as needed.

Ophthalmically acceptable antioxidants include, but are not limited to, sodium metabisulfite, sodium thiosulfate, acetylcysteine, butylated hydroxyanisole and butylated hydroxytoluene.

Other excipient components, which may be included in the ophthalmic preparations, are chelating agents. A useful chelating agent is edetate disodium, although other chelating agents may also be used in place or in conjunction with it.

For topical use, creams, ointments, gels, solutions or suspensions, etc., containing the composition disclosed herein are employed. Topical formulations may generally be comprised of a pharmaceutical carrier, co-solvent, emulsifier, penetration enhancer, preservative system, and emollient.

For intravenous or intramuscular administration, the compositions described herein may be dissolved or dispersed in a pharmaceutically acceptable diluent, such as a saline or dextrose solution. Suitable excipients may be included to achieve the desired pH, including but not limited to NaOH, sodium carbonate, sodium acetate, HCl, and citric acid. Accordingly, buffers including acetate buffers, citrate buffers, phosphate buffers and borate buffers may be used to adjust the pH of these formulations as needed. Antioxidant excipients may include sodium bisulfite, acetone sodium bisulfite, sodium formaldehyde, sulfoxylate, thiourea, and edetate disodium. Other non-limiting examples of suitable excipients found in the final intravenous composition may include sodium or potassium phosphates, citric acid, tartaric acid, gelatin, and carbohydrates such as dextrose, mannitol, and dextran. Further acceptable excipients are described in Powell, et al., Compendium of Excipients for Parenteral Formulations, *PDA Pharm Sci and Tech* 1998, 52 238-311 and Nema et al., Excipients and Their Role in Approved Injectable Products: Current Usage and Future Directions, *PDA Pharm Sci and Tech* 2011, 65 287-332, both of which are incorporated herein by reference in their entirety. Antimicrobial agents may also be included to achieve a bacteriostatic or fungistatic solution, including but not limited to phenylmercuric nitrate, thimerosal, benzethonium chloride, benzalkonium chloride, phenol, cresol, and chlorobutanol.

The compositions for intravenous or intramuscular administration may be provided to caregivers in the form of one more solids that are reconstituted with a suitable diluent such as sterile water, saline or dextrose in water shortly prior to administration. In other embodiments, the compositions are provided in solution ready to administer parenterally. In still other embodiments, the compositions are provided in a solution that is further diluted prior to administration. In embodiments that include administering a combination of a composition described herein and another agent, the combination may be provided to caregivers as a mixture, or the caregivers may mix the two agents prior to administration, or the two agents may be administered separately.

The actual dose of the active compositions described herein depends on the specific composition, and on the condition to be treated; the selection of the appropriate dose is well within the knowledge of the skilled artisan. In some embodiments, a daily dose may be from about 0.25 mg/kg to about 120 mg/kg or more of body weight, from about 0.5 mg/kg or less to about 100 mg/kg, from about 1.0 mg/kg to about 80 mg/kg of body weight, or from about 1.5 mg/kg to about 75 mg/kg of body weight. Thus, for administration to a 70 kg person, the dosage range would be from about 17 mg per day to about 8000 mg per day, from about 35 mg per day or less to about 7000 mg per day or more, from about 70 mg per day to about 6000 mg per day, from about 100 mg per day to about 5000 mg per day, or from about 200 mg to about 3000 mg per day.

In some embodiments, the composition described herein can be administered as a 15-minute intravenous infusion. In some embodiments, the composition described herein can be administered as a 5 min to about 30 min intravenous infusion. The composition described herein can be given as a single or repeated dose.

In some embodiments, the composition can be administered through subcutaneous infusion. In some embodiments, the composition described herein can be administered through subcutaneous infusion in combination with Hylenex® recombinant.

In some embodiments, for adult and adolescent patients weighing 50 kg and over, the dosage for the active compositions described herein can be 1000 mg every 6 hours or 650 mg every 4 hours to a maximum of 4000 mg per day. In some embodiments, for adult and adolescent patients weighing 50 kg and over, the dosage for the active compositions described herein can be in the range of about 500 mg to 1500 mg every 6 hours or in the range of about 300 mg to about 1000 mg every 4 hours. In some embodiments, for adult and adolescent patients weighing 50 kg and over, the maximum dosage per day can be in the range of about 2000 mg to about 6000 mg.

In some embodiments, for adult and adolescent patients weighing under 50 kg, the dosage for the active compositions described herein can be 15 mg/kg every 6 hours or 12.5 mg/kg every 4 hours to a maximum of 75 mg/kg per day. In some embodiments, for adult and adolescent patients weighing under 50 kg, the dosage for the active compositions described herein can be in the range of about 10 mg/kg to about 20 mg/kg every 6 hours or 8 mg/kg to about 15 mg/kg every 4 hours. In some embodiments, for adult and adolescent patients weighing under 50 kg, the maximum dosage per day can be in the range of about 50 mg/kg to about 100 mg/kg.

In some embodiments, for children 2 years to 12 years old, the dosage for the active compositions described herein can be 15 mg/kg every 6 hours or 12.5 mg/kg every 4 hours to a maximum of 75 mg/kg per day. In some embodiments, for children 2 years to 12 years old, the dosage for the active compositions described herein can be in the range of about 10 mg/kg to about 20 mg/kg every 6 hours or 8 mg/kg to about 15 mg/kg every 4 hours. In some embodiments, for children 2 years to 12 years old, the maximum dosage per day can be in the range of about 50 mg/kg to about 100 mg/kg.

In some embodiments, the minimum dosing interval can be 4 hours. In some embodiments, the minimum dosing interval can be in the range of about 1 hour to 8 hours. In some embodiments, the minimum dosing interval can be 1, 2, 3, 4, 5, 6, 7, or 8 hours.

Method of Treatment

Some embodiments relate to a method of mitigating or treating fever or alleviating pain in a subject in need thereof, comprising administering by injection to the subject an effective amount of a liquid formulation comprising acetaminophen and sulfoalkyl ether cyclodextrin, wherein the molar ratio of sulfoalkyl ether cyclodextrin to acetaminophen is in the range of about 0.01 to about 2.

In some embodiments, the composition described herein can be used for management of mild to moderate pain. In some embodiments, the composition described herein can be used for management of moderate to severe pain with one or more adjunctive opioid analgesics. In some embodiments, the composition described herein can be co-administered with tramadol (or tramadol hydrochloride).

In some embodiments, the composition described herein can be co-administered with one or more anesthetic agent. In some embodiments, the composition described herein can be co-administered with etomidate.

In some embodiments, the liquid formulation is administered using a needle free injector. Examples of the needle free injector can be found in U.S. Pat. No. 7,156,823, which is incorporated herein by reference in its entirety.

Administration of the compositions disclosed herein can be via any of the accepted modes of administration for agents that serve similar utilities including, but not limited to, orally, subcutaneously, intravenously, intranasally, topically, transdermally, intraperitoneally, intramuscularly, intrapulmonarilly, vaginally, rectally, intrathecally, or intraocularly. In some embodiments, the liquid formulation is injected intramuscularly. In some embodiments, the liquid formulation is injected intravenously. In some embodiments, the liquid formulation is injected subcutaneously.

Some embodiments include co-administering a composition, and/or pharmaceutical composition described herein, with an additional medicament. By "co-administration," it is meant that the two or more agents may be found in the patient's bloodstream at the same time, regardless of when or how they are actually administered. In one embodiment, the agents are administered simultaneously. In one such embodiment, administration in combination is accomplished by combining the agents in a single dosage form. In another embodiment, the agents are administered sequentially. In another embodiment, the composition containing acetaminophen and sulfoalkyl ether cyclodextrin is administered prior to the additional active agent. In another embodiment, the composition containing acetaminophen and sulfoalkyl ether cyclodextrin is administered after the additional active agent. In one embodiment the agents are administered through the same route, such as orally. In another embodiment, the agents are administered through different routes, such as one being administered orally and another being administered i.v.

Examples of additional medicaments include hydrocodone.

To further illustrate this invention, the following examples are included. The examples should not, of course, be construed as specifically limiting the invention. Variations of these examples within the scope of the claims are within the purview of one skilled in the art and are considered to fall within the scope of the invention as described, and claimed herein. The reader will recognize that the skilled artisan, armed with the present disclosure, and skill in the art is able to prepare and use the invention without exhaustive examples.

EXAMPLES

Example 1

Phase Solubility Study

Acetaminophen was added to reach its full solubility in various CAPTISOL® solutions (10 mM, 20 mM, 30 mM, 50 mM, and 100 mM) that were prepared by adding various amount of CAPTISOL® to a 25 mM pH 7.0 phosphate buffer. The acetaminophen solubility was measured at 25° C. and 5° C. The phase solubility curve is shown in FIG. 1.

In FIG. 1, the solubility of acetaminophen with no CAPTISOL® present is about 15.98±0.43 mg/ml at 25° C. and about 8.86±1.22 mg/ml at 5° C. The solubility data has indicated that a 10 mg/ml acetaminophen solution can be made at 5° C. with less than 0.05 M CAPTISOL®.

Example 2

Stability Study

Acetaminophen was added to reach its full solubility in various CAPTISOL® solutions (10 mM, 20 mM, 30 mM, 50 mM, and 100 mM) that were prepared by adding various amount of CAPTISOL® to a 25 mM pH 7.0 phosphate buffer. The solutions were not scrubbed of oxygen during preparation or prior to storage. These solutions maintained stability and did not change color after more than one month storage at room temperature. The shelf-life of the acetaminophen CAPTISOL® solutions were expected to be over 2 years at 25° C.

A comparative sample was prepared by combining 1000 mg acetaminophen USP, 3850 mg mannitol USP, 25 mg cysteine hydrochloride monohydrate USP, 10.4 mg dibasic sodium phosphate USP. The pH was adjusted with hydrochloride acid and/or sodium hydroxide to approximately 5.5 and the osmolality was maintained to approximately 290 mOsm/kg. The comparative sample was stored at 5° C. and precipitation was observed after 12 hours and the acetaminophen concentration dropped to 8.8 mg/ml (formulated at 10 mg/ml) after 24 hours. The comparative sample turned yellow on standing at room temperature over a 24 hour period. The comparative sample had crystals formed after 12 weeks. When the comparative sample was stored at 40° C. and exposed to air, the comparative sample solution started to turn yellow after six days, which suggested that oxygen scrubbing was important for maintaining the stability of the comparative sample.

Example 3

Long-term Stability Study

Figure 2:
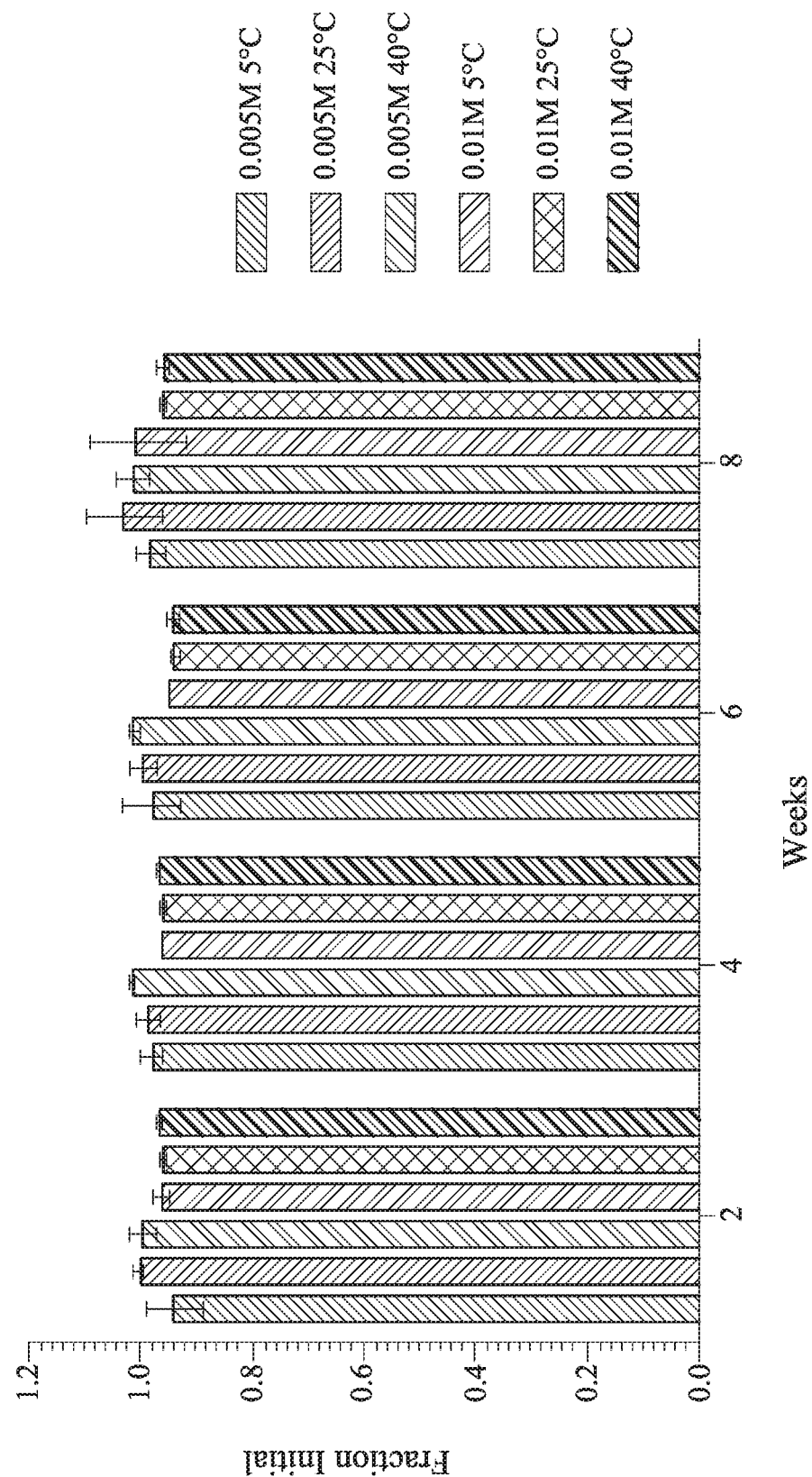
FIG. 2 shows the stability study of acetaminophen CAPTISOL® solutions at various temperatures during eight weeks.

CAPTISOL® solutions were prepared by adding CAPTISOL® to 3 mM pH 7.2 phosphate buffer to provide solutions having CAPTISOL® at 0.005M and 0.01M. Acetaminophen was then added to the 0.005M and 0.01 M CAPTISOL® solutions, and the osmolality of the solutions were adjusted to 298 mOsm/kg and 304 mOsm/kg with final NaCl concentration to be 0.11 M and 0.93M respectively. The pH of the solutions dropped to about 6.8. The solutions were stable for eight weeks at temperature up to 40° C. as shown in FIG. 2. Slight color formation was observed in the 40° C. vials after two weeks and in the 25° C. vials after four weeks. These solutions were not scrubbed of oxygen during preparation or prior to storage.

Example 4

Stability with Acetate Buffer and Phosphate Buffer

CAPTISOL® solutions were prepared by adding CAPTISOL® to pH 5.8 acetate buffer to provide solutions having CAPTISOL® at 0.01M, 0.05M, and 0.1 M; and acetaminophen was then added to the 0.01 M, 0.05 M, and 0.1M CAPTISOL® solutions to have a concentration of 10 mg/ml. Comparative samples were prepared by adding CAPTISOL® to pH 7.0 phosphate buffer to provide solutions having CAPTISOL® at 0.01M, 0.05M, and 0.1 M; and acetaminophen was then added to the 0.01 M, 0.05 M, and 0.1M CAPTISOL® solutions to achieve a concentration of 10 mg/ml. The samples were kept at 5° C., 25° C. with 60% relative humidity (RH), or 40° C. with 75% of RH. The samples were analyzed at the time of preparation and after being stored for 1 month, 3 months, 6 months, 9 months, and 12 months. The results are shown in Table 1.

TABLE 1

Stability of acetaminophen CAPTISOL® formulations containing acetate buffer or phosphate buffer

|  | Samples | Appearance | pH | p-aminophenol/ (μg/ml) | Single largest impurity/ (mAU * min) | Total related substance/ (mAU * min) |
|---|---|---|---|---|---|---|
| CAPTISOL® 0.01M in Acetate buffer | $T_0$ (time of preparation) | Clear, colorless solution | 5.79 | <LOD | 0.501 | 1.060 |
|  | 5° C. (1 Month) | Clear, colorless solution | 5.78 | <LOD | 0.64 (9.2 min) | 1.328 |
|  | 5° C. (3 Months) | Clear, colorless solution | 5.78 | ND | 1.10 (9.1 min) | 1.927 |
|  | 5° C. (6 Months) | Clear, colorless solution | ND | ND | 0.66 (9.0 min) | 1.362 |
|  | 5° C. (9 Months) | Clear, colorless solution | 5.85 | ND | ND | ND |

TABLE 1-continued

Stability of acetaminophen CAPTISOL® formulations containing acetate buffer or phosphate buffer

| | Samples | Appearance | pH | p-aminophenol/ (μg/ml) | Single largest impurity/ (mAU * min) | Total related substance/ (mAU * min) |
|---|---|---|---|---|---|---|
| | 5° C. (12 Months) | Clear, colorless solution | 5.77 | ND | 1.79 (8.8 min) | 2.638 |
| | 25° C. (1 Month) | Clear, colorless solution | 5.79 | <LOD | 2.13 (8.7 min) | 3.039 |
| | 25° C. (3 Months) | Clear, colorless solution | 5.77 | ND | 15.71 (8.9 min) | 18.204 |
| | 25° C. (6 Months) | Clear, colorless solution | ND | ND | 35.30 (9.3 min) | 40.403 |
| | 25° C. (9 Months) | Clear, colorless solution | 5.79 | ND | ND | ND |
| | 25° C. (12 Months) | Clear, slightly brown | 5.72 | 0.007 | 50.93 (8.5 min) | 58.922 |
| | 40° C. (1 Month) | Clear, slightly brown solution | 5.75 | <LOD | 44.3 (8.6 min) | 51.641 |
| | 40° C. (3 Months) | Clear, slightly brown solution | 5.69 | <LOQ | 10.37 (8.9 min) | 13.423 |
| | 40° C. (6 Months) | Clear, slightly brown solution | ND | <LOQ | 185.4 (8.8 min) | 232.80 |
| | 40° C. (9 Months) | Clear, slightly brown solution | 5.78 | ND | ND | ND |
| CAPTISOL® 0.05M in Acetate buffer | $T_0$ (time of preparation) | Clear, colorless solution | 5.80 | <LOQ | 0.505 | 0.690 |
| | 5° C. (1 Month) | Clear, colorless solution | 5.78 | <LOD | 0.59 (10.6 min) | 1.087 |
| | 5° C. (3 Months) | Clear, colorless solution | 5.77 | ND | 0.66 (10.6 min) | 1.131 |
| | 5° C. (6 Months) | Clear, colorless solution | ND | ND | 0.49 (10.6 min) | 0.900 |
| | 5° C. (9 Months) | ND | 5.84 | ND | ND | ND |
| | 5° C. (12 Months) | Clear, colorless solution | 5.77 | ND | 0.88 (8.9 min) | 1.829 |
| | 25° C. (1 Month) | Clear, colorless solution | 5.77 | <LOD | 1.21 (8.5 min) | 2.120 |
| | 25° C. (3 Months) | Clear, colorless solution | 5.75 | <LOD | 3.54 (9.1 min) | 4.839 |
| | 25° C. (6 Months) | Clear, colorless solution | ND | ND | 5.22 (8.8 min) | 7.049 |
| | 25° C. (9 Months) | ND | 5.82 | ND | ND | ND |
| | 25° C. (12 Months) | Clear, tinge of brown | 5.72 | 0.004 | 7.31 (8.8 min) | 9.263 |
| | 40° C. (1 Month) | Clear, colorless solution | 5.75 | <LOD | 4.51 (9.0 min) | 6.060 |
| | 40° C. (3 Months) | Clear, colorless solution | 5.71 | <LOD | 10.5 (9.5 min) | 12.999 |

TABLE 1-continued

Stability of acetaminophen CAPTISOL ® formulations containing acetate buffer or phosphate buffer

|  | Samples | Appearance | pH | p-aminophenol/ ($\mu$g/ml) | Single largest impurity/ (mAU * min) | Total related substance/ (mAU * min) |
|---|---|---|---|---|---|---|
|  | 40° C. (6 Months) | Clear, colorless solution | ND | <LOD | 24.4 (8.8 min) | 30.967 |
|  | 40° C. (9 Months) | ND | 5.71 | ND | ND | ND |
| CAPTISOL ® 0.1M in Acetate buffer | $T_0$ (time of preparation) | Clear, colorless solution | 5.80 | <LOD | 0.547 | 0.947 |
|  | 5° C. (1 Month) | Clear, colorless solution | 5.80 | <LOQ | 0.62 (10.6 min) | 1.029 |
|  | 5° C. (3 Months) | Clear, colorless solution | 5.78 | <LOD | 0.57 (10.6 min) | 0.893 |
|  | 5° C. (6 Months) | Clear, colorless solution | ND | <LOD | 0.53 (10.7 min) | 0.961 |
|  | 5° C. (9 Months) | ND | 5.88 | ND | ND | ND |
|  | 5° C. (12 Months) | Clear, colorless solution | 5.777 | ND | 0.55 (10.6 min) | 0.775 |
|  | 25° C. (1 Month) | Clear, colorless solution | 5.79 | <LOQ | 0.50 (10.6 min) | 0.701 |
|  | 25° C. (3 Months) | Clear, colorless solution | 5.82 | <LOQ | 0.49 (10.6 min) | 1.088 |
|  | 25° C. (6 Months) | Clear, colorless solution | ND | <LOD | 1.02 (9.3 min) | 2.009 |
|  | 25° C. (9 Months) | ND | 5.83 | ND | ND | ND |
|  | 25° C. (9 Months) | Clear, colorless solution | 6.119 | 0.0127 | 0.49 (10.6 min) | 0.951 |
|  | 40° C. (1 Month) | Clear, colorless solution | 5.76 | <LOQ | 0.52 (10.4 min) | 1.085 |
|  | 40° C. (3 Months) | Clear, colorless solution | 5.70 | <LOQ | 4.17 (9.0 min) | 6.7878 |
|  | 40° C. (6 Months) | Clear, colorless solution | ND | 0.0803 | 0.56 (10.6 min) | 1.27 |
|  | 40° C. (9 Months) | ND | 5.77 | ND | ND | ND |
| CAPTISOL ® 0.01M in phosphate buffer | $T_0$ (time of preparation) | Clear, colorless solution | 6.99 | <LOD | 0.540 | 0.941 |
|  | 5° C. (1 Month) | Clear, colorless solution | 6.96 | ND | 0.99 (8.8 min) | 1.777 |
|  | 5° C. (3 Months) | Clear, colorless solution | 6.97 | <LOD | 0.75 (8.8 min) | 1.438 |
|  | 5° C. (6 Months) | Clear, colorless solution | ND | ND | 1.34 (9.0 min) | 2.089 |
|  | 5° C. (9 Months) | Clear, colorless solution | 7.01 | ND | ND | ND |
|  | 5° C. (12 Months) | Clear, colorless solution | 6.95 | ND | 2.76 (8.8 min) | 3.710 |
|  | 25° C. (1 Month) | Clear, colorless solution | 6.97 | <LOD | 6.42 (9.2 min) | 7.617 |
|  | 25° C. (3 Months) | Clear, colorless solution | 6.95 | <LOD | 20.8 (9.1 min) | 23.468 |

TABLE 1-continued

Stability of acetaminophen CAPTISOL ® formulations containing acetate buffer or phosphate buffer

| | Samples | Appearance | pH | p-aminophenol/ (µg/ml) | Single largest impurity/ (mAU * min) | Total related substance/ (mAU * min) |
|---|---|---|---|---|---|---|
| | 25° C. (6 Months) | Clear, colorless solution | ND | <LOQ | 52.3 (8.9 min) | 58.947 |
| | 25° C. (9 Months) | Clear, slightly brown solution | 6.99 | ND | ND | ND |
| | 25° C. (12 Months) | Clear, slightly brown solution | 6.10 | 0.091 | 74.1 (8.6 min) | 84.089 |
| | 40° C. (1 Month) | Clear, slightly brown solution | 6.95 | <LOQ | 34.07 (9.2 min) | 38.365 |
| | 40° C. (3 Months) | Clear, slightly brown solution | 6.90 | <LOD | 122.4 (9.3 min) | 141.869 |
| | 40° C. (6 Months) | Clear, slightly brown solution | ND | <LOD | 113.6 (9.2 min) | 130.802 |
| | 40° C. (9 Months) | Clear, slightly brown solution | 6.95 | ND | ND | ND |
| CAPTISOL ® 0.05M in phosphate buffer | T$_0$ (time of preparation) | Clear, colorless solution | 7.00 | <LOD | 0.500 | 0.681 |
| | 5° C. (1 Month) | Clear, colorless solution | 6.97 | ND | 0.56 (10.6 min) | 0.970 |
| | 5° C. (3 Months) | Clear, colorless solution | 6.96 | ND | 0.59 (10.6 min) | 1.010 |
| | 5° C. (6 Months) | Clear, colorless solution | ND | ND | 0.45 (10.7 min) | 1.031 |
| | 5° C. (9 Months) | Clear, colorless solution | 7.04 | ND | ND | ND |
| | 5° C. (12 Months) | Clear, colorless solution | 6.96 | ND | 0.99 (8.8 min) | 1.770 |
| | 25° C. (1 Month) | Clear, colorless solution | 6.96 | ND | 1.13 (9.5 min) | 1.491 |
| | 25° C. (3 Months) | Clear, colorless solution | 6.96 | <LOD | 0.98 (9.1 min) | 1.750 |
| | 25° C. (6 Months) | Clear, colorless solution | ND | <LOD | 8.10 (8.8 min) | 10.264 |
| | 25° C. (9 Months) | Clear, colorless solution | 7.01 | ND | ND | ND |
| | 25° C. (12 Months) | Clear, slight brown tinge | 6.93 | 0.013 | 16.8 (8.6 min) | 20.619 |
| | 40° C. (1 Month) | Clear, colorless solution | 6.95 | <LOD | 7.63 (8.7 min) | 9.795 |
| | 40° C. (3 Months) | Clear, colorless solution | 6.92 | <LOQ | 23.0 (8.9 min) | 28.508 |
| | 40° C. (6 Months) | Clear, colorless solution | ND | 0.000171 | 56.1 (9.0 min) | 69.479 |

TABLE 1-continued

Stability of acetaminophen CAPTISOL ® formulations containing acetate buffer or phosphate buffer

| Samples | | Appearance | pH | p-aminophenol/ (μg/ml) | Single largest impurity/ (mAU * min) | Total related substance/ (mAU * min) |
|---|---|---|---|---|---|---|
| | 40° C. (9 Months) | Clear, slightly brown solution | 6.98 | ND | ND | ND |
| CAPTISOL ® 0.1M in phosphate buffer | $T_0$ (time of preparation) | Clear, colorless solution | 7.00 | <LOQ | 0.495 | 0.950 |
| | 5° C. (1 Month) | Clear, colorless solution | 6.97 | ND | 0.50 (10.6 min) | 0.699 |
| | 5° C. (3 Months) | Clear, colorless solution | 6.97 | ND | 0.53 (10.6 min) | 0.950 |
| | 5° C. (6 Months) | Clear, colorless solution | ND | ND | 0.48 (10.6 min) | 0.994 |
| | 5° C. (9 Months) | Clear, colorless solution | 7.05 | ND | ND | ND |
| | 5° C. (12 Months) | Clear, colorless solution | 6.96 | 0.006 | 0.52 (10.6 min) | 1.232 |
| | 25° C. (1 Month) | Clear, colorless solution | 6.96 | <LOD | 0.53 (9.1 min) | 1.343 |
| | 25° C. (3 Months) | Clear, colorless solution | 6.94 | <LOQ | 0.91 (9.2 min) | 1.780 |
| | 25° C. (6 Months) | Clear, colorless solution | ND | <LOQ | 1.60 (9.2 min) | 2.798 |
| | 25° C. (9 Months) | Clear, colorless solution | 7.01 | ND | ND | ND |
| | 25° C. (12 Months) | Clear, colorless solution | 6.92 | 0.033 | 3.28 (8.0 min) | 5.305 |
| | 40° C. (1 Month) | Clear, colorless solution | 6.95 | <LOQ | 2.88 (8.7 min) | 4.877 |
| | 40° C. (3 Months) | Clear, colorless solution | 6.91 | <LOQ | 7.25 (9.5 min) | 11.146 |
| | 40° C. (6 Months) | Clear, colorless solution | ND | 0.2 | 18.4 (8.2 min) | 27.778 |
| | 40° C. (9 Months) | Clear, slightly brown solution | 6.96 | ND | ND | ND | p-Aminophenol: LOD = 0.02 μg/mL, LOQ = 0.05 μg/mL.
ND: not detected

As shown in Table 1, formulations containing acetate buffer have generally shown better stability than formulations containing phosphate buffer. For example, there were less p-aminophenol, the degradative product of acetaminophen, in the acetate formulations than in the phosphate formulations at 6 months as measured for the 0.05M CAPTISOL® formulations stored at 40° C. and 75% RH. In addition, the amount of the total related substances ("TRS" impurities other than p-aminophenol) for acetate formulations was generally less than that of the phosphate formulations (e.g, TRS=1.27 mAU*min for acetate formulation vs. TRS=18.4 mAU*min for phosphate formulation in the 0.1M CAPTISOL® formulations stored at 40° C. and 75% RH for 6 months). The single largest impurity ("SLI", impurities other than p-aminophenol) is different for the two formulations. For instance, for formulations stored at 40° C. and 75% RH for 6 months, the acetate formulation has a retention time of about 10.6 min for the SLI, while the phosphate formulation has a retention time of about 8.2 min for the SLI; the area size of the SLI in the acetate formulation is also significantly smaller than that of the phosphate formulation, indicating less amount of the impurity present in the formulation.

In addition, the results in Table 1 also show that increasing CAPTISOL® concentration increased the formulation stability. For both acetate and phosphate formulations, the amount of the IRS decreased with increased CAPTISOL® concentrations; and there were less brown color in the formulations stored at 40° C. and 75% RH with increased CAPTISOL® concentrations.

Moreover, lower storage temperature also improved formulation stability. As shown in Table 1, the amount of the TRS was less when stored at lower temperature, and the solution color remained clear and colorless for storage at 5° C. and 25° C. and turned slight brown at 6 months for storage at 40° C.

Example 5

Stability of Ofirmev and Acetaminophen CAPTISOL® Formulations

CAPTISOL® solutions were prepared by adding CAPTISOL® to pH 5.8 acetate buffer to provide solutions having CAPTISOL® at 0.1 M; and acetaminophen was then added to the CAPTISOL® solutions to achieve a concentration of 10 mg/ml. The Ofirmev® formulations having 10 mg/ml acetaminophen commercial product were used as comparative samples. The samples were stored at 5° C., 25° C. with 60% relative humidity (RH), or 40° C. with 75% of RH. The samples were analyzed at the time of preparation and after being stored for 1 month, 3 months, 6 months, 9 months, and 12 months. The results are shown in Table 2.

TABLE 2

Stability of Ofirmev and acetaminophen formulations containing CAPTISOL ®

| | Samples | Appearance | pH | p-aminophenol/ (µg/ml) | Single largest impurity/ (mAU * min) | Total related substance/ (mAU * min) |
|---|---|---|---|---|---|---|
| CAPTISOL ® 0.1M with acetate buffer | $T_0$ (time of preparation) | Clear, colorless solution | 5.80 | <LOD | 0.547 | 0.947 |
| | 5° C. (1 Month) | Clear, colorless solution | 5.80 | <LOQ | 0.62 (10.6 min) | 1.029 |
| | 5° C. (3 Months) | Clear, colorless solution | 5.78 | <LOD | 0.57 (10.6 min) | 0.893 |
| | 5° C. (6/9 Months) | Clear, colorless solution | 5.88 | <LOD | 0.53 (10.7 min) | 0.961 |
| | 5° C. (12 Months) | Clear, colorless solution | 5.77 | ND | 0.55 (10.6 min) | 0.775 |
| | 25° C. (1 Month) | Clear, colorless solution | 5.787 | <LOQ | 0.50 (10.6 min) | 0.702 |
| | 25° C. (3 Months) | Clear, colorless solution | 5.82 | <LOQ | 0.49 (10.6 min) | 1.088 |
| | 25° C. (6 Months) | Clear, colorless solution | 5.827 | <LOD | 1.02 (9.3 min) | 2.009 |
| | 25° C. (12 Months) | ND | 6.119 | 0.0127 | 0.49 (10.6 min) | 0.951 |
| | 40° C. (1 Month) | Clear, colorless solution | 5.76 | <LOQ | 0.52 (10.4 min) | 1.085 |
| | 40° C. (3 Months) | Clear, colorless solution | 5.70 | <LOQ | 4.17 (9.0 min) | 6.7878 |
| | 40° C. (6/9 Months) | Clear, colorless solution | 5.77 | 0.0803 | 0.56 (10.6 min) | 1.27 |
| Ofirmev 10 mg/ml acetaminophen | $T_0$ (time of preparation) | Clear, colorless solution | 5.79 | 2.732 | 0.604 (10.6 min) | 0.818 |
| | 5° C. (6 Months) | Clear, colorless solution | ND | 2.600 | p-aminophenol peak | 2.526 |
| | 5° C. (12 Months) | Clear, colorless solution | 5.48 | 2.71 | 6.15 (1.3 min) | 7.485 |
| | 25° C. (6 Months) | Clear, colorless solution | 5.55 | 4.000 | p-aminophenol peak | 3.434 |
| | 25° C. (12 Months) | Clear, colorless solution | 5.53 | 4.048 | 6.20 (1.3 min) | 7.50 |
| | 40° C. (6 Months) | Clear, colorless solution | 5.56 | 7.900 | p-aminophenol peak | 5.554 |

As shown in Table 2, the Acetaminophen in CAPTISOL® solution with acetate buffer showed better stability than the Ofirmev® formulation at 6 months and 12 months storage time under various temperatures. There were fewer total related substances at all three storage conditions in the CAPTISOL® formulations than the Ofirmev® formulations. The CAPTISOL® formulations also showed more stable pH than the Ofirmev® formulations. The amount of p-aminophenol, a degradative product of acetaminophen, is less in the CAPTISOL® formulations than the Ofirmev® formulations.

Figure 3:
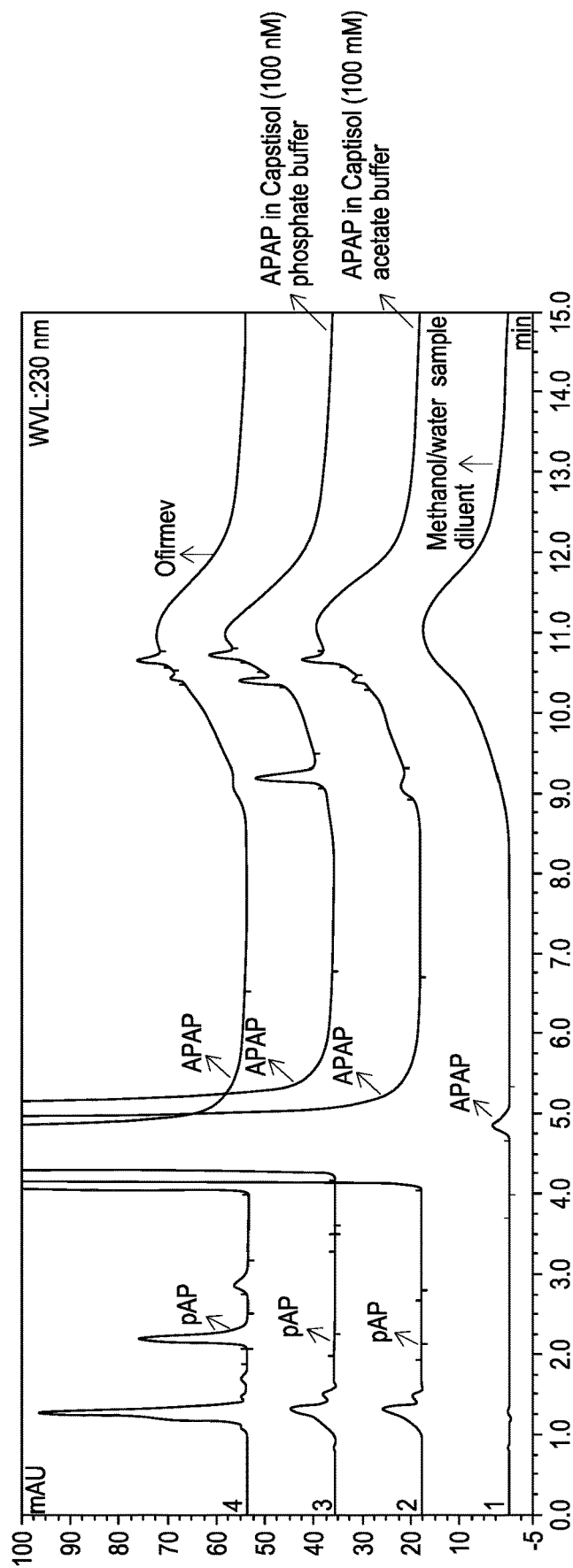
FIG. 3 shows the chromatogram of acetaminophen (10 mg/ml) formulations in CAPTISOL® (0.1M) with acetate buffer and phosphate buffer, the Ofirmev® formulations (10 mg/ml acetaminophen), and the methanol control that were stored at 25° C. and 60% RH for 6 months.

FIG. 3 shows the HPLC chromatogram of acetaminophen (10 mg/ml) formulations in CAPTISOL® (0.1M) with acetate buffer and phosphate buffer, the Ofirmev formulations (10 mg/ml acetaminophen), and the methanol solvent control that were stored at 25° C. and 60% RH for 12 months. As shown in FIG. 3, the Ofirmev formulation had more p-aminophenol impurity and total amount of impurities than the acetaminophen CAPTISOL® formulations after storage for 12 months. For the acetaminophen CAPTISOL® formulations, the use of acetate buffer has led to fewer impurities than the phosphate buffer.

Figure 4A:
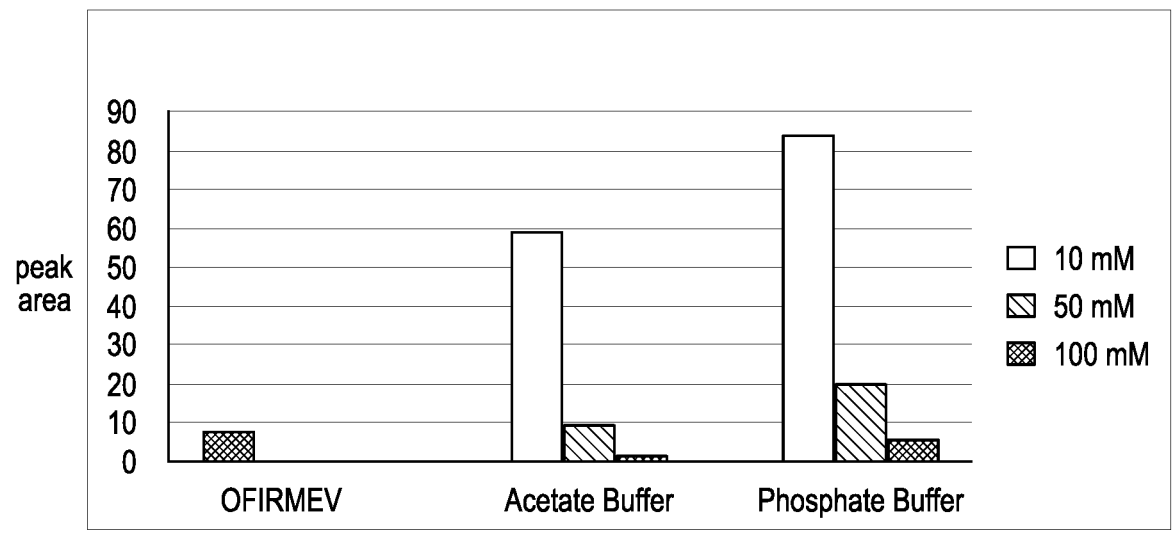
FIG. 4A illustrates the amount of total related substances detected in the Ofirmev® and also in the acetaminophen CAPTISOL® formulations after storage at 20° C. and 60% humidity for 12 months.
Figure 4B:
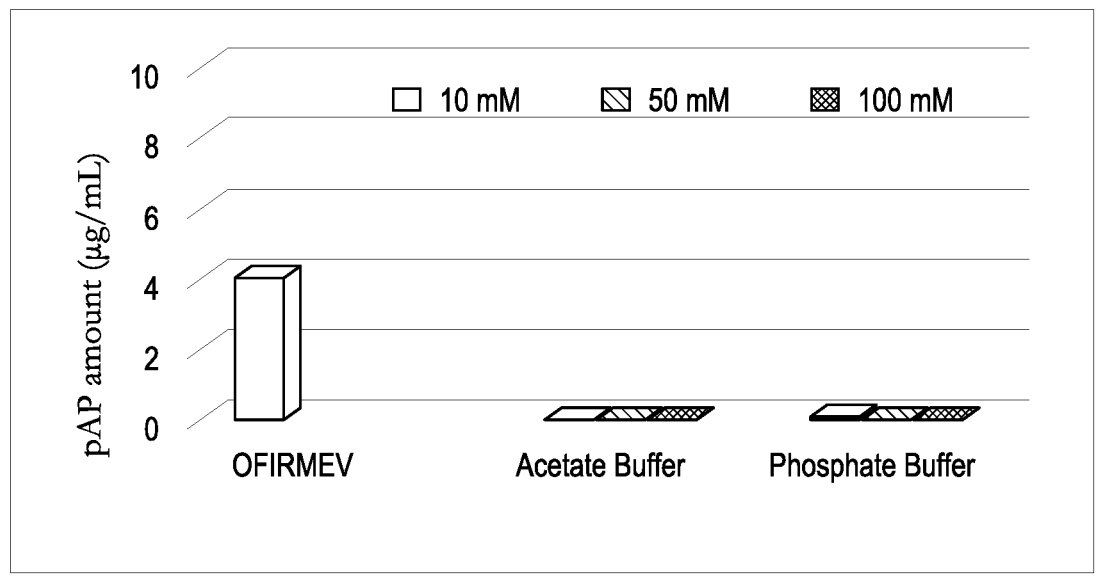
FIG. 4B illustrates the amount of p-aminophenol detected in the Ofirmev® and also in the acetaminophen CAPTISOL® formulations after storage at 20° C. and 60% humidity for 12 months

Table 3 shows the amount of impurities in the acetaminophen formulations after storage at 20° C. and 60% humidity for 12 months. FIG. 4A illustrates the amount of total related substances detected in the Ofirmev® and also in the acetaminophen CAPTISOL® formulations after storage at 20° C. and 60% humidity for 12 months; and FIG. 4B illustrates the amount of p-aminophenol detected in the Ofirmev® and also in the acetaminophen CAPTISOL® formulations after storage at 20° C. and 60% humidity for 12 months.

TABLE 3

Impurities detected in the acetaminophen formulations after storage at 20° C. and 60% humidity for 12 months

| | Total Related Substances | p-aminophenol |
|---|---|---|
| Ofirmev ® | 7.5 | 4.048 |
| CAPTISOL ® 10 mM in Acetate buffer | 59 | 0.007 |
| CAPTISOL ® 50 mM in Acetate buffer | 9.3 | 0.004 |
| CAPTISOL ® 100 mM in Acetate buffer | 0.95 | 0.0127 |
| CAPTISOL ® 10 mM in phosphate buffer | 84 | 0.091 |
| CAPTISOL ® 50 mM in phosphate buffer | 20.6 | 0.013 |
| CAPTISOL ® 100 mM in phosphate buffer | 5.3 | 0.033 |

As shown in Table 3 and FIGS. 4A and 4B, the amount of impurities decreased with increasing CAPTISOL® concentration. In addition, acetaminophen solutions in acetate buffer at pH 5.8 had fewer amounts of total impurities than the solutions in phosphate buffer at pH 7. In addition, the amount of p-aminophenol in the CAPTISOL® formulations was well below the limit of detection, and the amount of p-aminophenol in the Ofirmev solution was eight times greater than the amount allowed under USP (e.g. 0.5 µg/ml specified in USP monograph).

Example 6

Acetaminophen CAPTISOL® Formulations

An acetaminophen CAPTISOL® formulation is prepared by first adding CAPTISOL® to a buffer (e.g., pH 5.8 acetate buffer or pH 7.0 phosphate buffer) to provide solutions having CAPTISOL® at 100 mg/ml; and then adding acetaminophen to the CAPTISOL® solutions to achieve a concentration of 10 mg/ml.

Another acetaminophen CAPTISOL® formulation is prepared by first adding CAPTISOL® to a buffer (e.g., pH 5.8 acetate buffer or pH 7.0 phosphate buffer) to provide solutions having 360 mg/ml CAPTISOL®; and then adding 500 mg acetaminophen to 15 ml of the CAPTISOL® solutions.

Another acetaminophen CAPTISOL® formulation is prepared by first combining 1 g acetaminophen and 33.33 ml of CAPTISOL® solutions (250 mg/ml), and then drying the solution to be aseptic spray-dried powder for constitution.

Another acetaminophen CAPTISOL® formulation is prepared by first combining 250 mg acetaminophen and 12.5 ml of CAPTISOL® solutions (100 mg/ml), and then lyophilizing the solution to form powder for constitution.

What is claimed is:

1. A pharmaceutical formulation, comprising:
   acetaminophen; and
   a sulfoalkyl ether cyclodextrin,
   wherein the sulfoalkyl ether cyclodextrin is a compound having the structure:

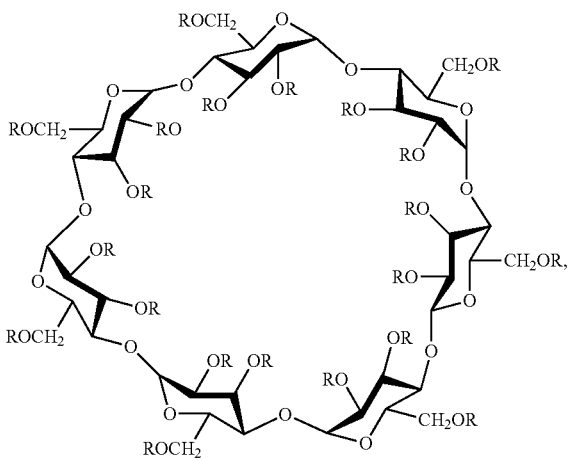

wherein each R is independently —H or —(CH$_2$)$_4$SO$_3$Na and the average degree of substitution with —(CH$_2$)$_4$SO$_3$Na groups is between 6 and 7.1;
   wherein the molar ratio of the sulfoalkyl ether cyclodextrin to acetaminophen is in the range of about 0.05 to about 1.5, and wherein the formulation does not contain N-acetylcysteine, L-methionine, L-cysteine, cysteine hydrochloride, or mixtures thereof;
   wherein the formulation is an aqueous solution;
   wherein the concentration of acetaminophen is in the range of about 8 mg/ml to about 12 mg/ml; and
   wherein the sulfoalkyl ether cyclodextrin has a concentration of about 50 mM to about 100 mM.

2. The formulation of claim 1, wherein the molar ratio of sulfoalkyl ether cyclodextrin to acetaminophen is about 1.5.

3. The formulation of claim 1, wherein the molar ratio of sulfoalkyl ether cyclodextrin to acetaminophen is in the range of about 0.05 to less than 1.

4. The formulation of claim 1, wherein the concentration of acetaminophen is about 10 mg/ml.

5. The formulation of claim 1, further comprises less than 2.6 µg/ml of p-aminophenol.

6. The formulation of claim 1, further comprises less than 0.05 µg/ml of p-aminophenol.

7. The formulation of claim 1, further comprises less than 0.015% of p-aminophenol by weight based on the total amount of acetaminophen in the formulation.

8. The formulation of claim 5, wherein the amount of p-aminophenol is determined after the formulation is stored at 25° C. for 12 months.

9. The formulation of claim 1, wherein the formulation is scrubbed of oxygen.

10. The formulation of claim 1, wherein the formulation is not scrubbed of oxygen.

11. The formulation of claim 1, wherein the formulation does not contain a corticosteroid.

12. The formulation of claim 1, wherein the formulation does not contain an androgen.

13. The formulation of claim 1, wherein the formulation does not contain a clopidogrel.

14. The formulation of claim 1, wherein the formulation does not contain a fluoroquinolone.

15. The formulation of claim 1, wherein the formulation does not contain a benzhydrylpiperazine.

16. The formulation of claim 1, wherein the formulation does not contain a cetirizine.

17. The formulation of claim 1, wherein the formulation does not contain a nicotine.

18. The formulation of claim 1, wherein the formulation does not contain a 17α-ethynyl-5α-androstane-3α, 17β-diol.

19. The formulation of claim 1, wherein the formulation does not contain a pyrone analog.

20. The formulation of claim 1, wherein the formulation does not contain a flavonoid.

21. The formulation of claim 1, wherein the formulation does not contain a quercetin.

22. The formulation of claim 1, further comprising one or more pharmaceutically acceptable excipient.

23. The formulation of claim 1, further comprising a buffer.

24. The formulation of claim 23, wherein the buffer is a phosphate buffer.

25. The formulation of claim 23, wherein the buffer is an acetate buffer.

26. The formulation of claim 23, wherein the buffer has a concentration in the range of 1 mM to about 100 mM.

27. The formulation of claim 1, wherein the formulation has a pH in the range of about 5 to about 10.

28. The formulation of claim 27, wherein the pH of the formulation is in the range of about 5.8 to about 7.4.

29. The formulation of claim 1, wherein the formulation has a pH greater than 5.8.

30. The formulation of claim 1, further comprising a salt.

31. The formulation of claim 30, wherein the salt is sodium chloride.

32. The formulation of claim 1, wherein the formulation has an osmolality in the range of about 100 mOsm/kg to about 500 mOsm/kg.

33. The formulation of claim 32, wherein the osmolality of the formulation is in the range of about 200 mOsm/kg to about 300 mOsm/kg.

34. An aqueous pharmaceutical formulation, consisting of:
   acetaminophen;
   a sulfoalkyl ether cyclodextrin, and
   a buffer;
   wherein the sulfoalkyl ether cyclodextrin is a compound having the structure:

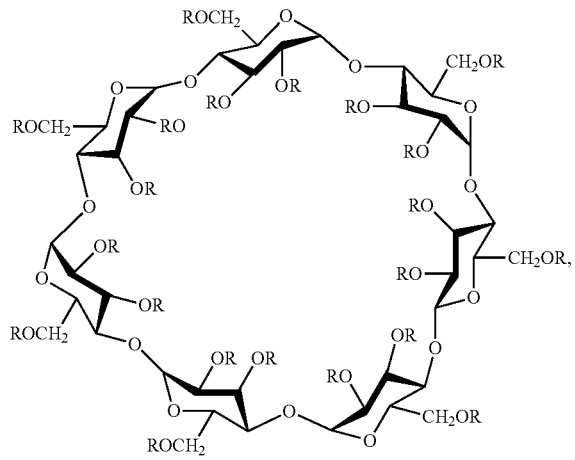

wherein each R is independently —H or —(CH$_2$)$_4$SO$_3$Na and the average degree of substitution with —(CH$_2$)$_4$SO$_3$Na groups is between 6 and 7.1;
wherein the molar ratio of the sulfoalkyl ether cyclodextrin to acetaminophen is in the range of about 0.05 to about 1.5,
wherein the concentration of acetaminophen is in the range of about 8 mg/ml to about 12 mg/ml; and
wherein the sulfoalkyl ether cyclodextrin has a concentration of about 50 mM to about 100 mM.

35. An aqueous pharmaceutical formulation, consisting essentially of:
   acetaminophen; and
   a sulfoalkyl ether cyclodextrin,
   wherein the sulfoalkyl ether cyclodextrin is a compound having the structure:

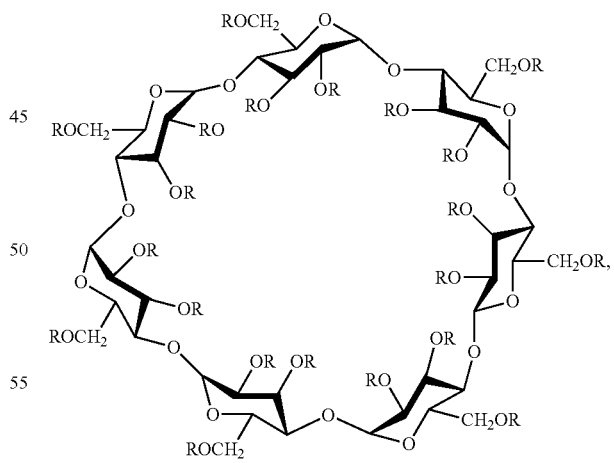

wherein each R is independently —H or —(CH$_2$)$_4$SO$_3$Na and the average degree of substitution with —(CH$_2$)$_4$SO$_3$Na groups is between 6 and 7.1;
wherein the molar ratio of the sulfoalkyl ether cyclodextrin to acetaminophen is in the range of about 0.05 to about 1.5,
wherein the concentration of acetaminophen is in the range of about 8 mg/ml to about 12 mg/ml; and wherein the sulfoalkyl ether cyclodextrin has a concentration of about 50 mM to about 100 mM.

36. The aqueous pharmaceutical formulation of claim 35, further comprising a buffer.

* * * * *